US012688320B2

(12) United States Patent
Tovar Velasco et al.

(10) Patent No.: US 12,688,320 B2
(45) Date of Patent: Jul. 21, 2026

(54) METHODS, SYSTEMS, ARTICLES OF MANUFACTURE AND APPARATUS TO PROTECT DATASETS

(71) Applicant: Nielsen Consumer LLC, Chicago, IL (US)

(72) Inventors: Javier Tovar Velasco, Cigales (ES); Antonio Hurtado García, Valladolid (ES)

(73) Assignee: Nielsen Consumer LLC, Chicago, IL (US)

( * ) Notice: Subject to any disclaimer, the term of this patent is extended or adjusted under 35 U.S.C. 154(b) by 153 days.

(21) Appl. No.: 18/619,656

(22) Filed: Mar. 28, 2024

(65) Prior Publication Data

US 2025/0307445 A1    Oct. 2, 2025

(51) Int. Cl.
*G06F 21/62* (2013.01)
*G06F 16/84* (2019.01)
(Continued)

(52) U.S. Cl.
CPC .......... *G06F 21/6218* (2013.01); *G06F 16/84* (2019.01); *H04L 9/0643* (2013.01); *H04L 9/3247* (2013.01)

(58) Field of Classification Search
CPC .......... G06F 16/84; G06F 21/10; G06F 21/16; G06F 21/6254; G06F 21/6245; G06F 21/602; G06F 21/78; G06F 21/6218; G09C 5/00; H04L 9/3239; H04L 9/3213;

H04L 9/0643; H04L 9/0869; H04L 9/3247; H04L 9/0825; H04L 9/0866; H04L 9/0844; H04L 9/008
See application file for complete search history.

(56) References Cited

U.S. PATENT DOCUMENTS 7,752,446 B2    7/2010 Agrawal et al.
2005/0055554 A1   3/2005 Sion et al.
(Continued)

OTHER PUBLICATIONS

International Searching Authority, "International Search Report," issued in connection with International Patent Application No. PCT/US2025/021800, mailed on Jul. 7, 2025, 3 pages.
(Continued)

*Primary Examiner* — Kyung H Shin
(74) *Attorney, Agent, or Firm* — Hanley, Flight & Zimmerman, LLC

(57) ABSTRACT

Systems, apparatus, articles of manufacture, and methods are disclosed to protect datasets. An example apparatus includes interface circuitry, machine-readable instructions, and at least one processor circuit to be programmed by the machine-readable instructions to transform a watermark string to a numeric representation, the numeric representation including position values, determine a row hash value of a dataset satisfies a threshold, the row hash value based on a key value and at least one non-alterable attribute of the dataset, and determine an alteration setting for an alterable attribute based on one of the position values, the one of the position values based on a modulo of (a) an attribute hash value associated with the alterable attribute and (b) a length value of the numeric representation.

20 Claims, 15 Drawing Sheets

(51) Int. Cl.
    *H04L 9/06*          (2006.01)
    *H04L 9/32*          (2006.01)

(56)              References Cited

U.S. PATENT DOCUMENTS

| | | | |
|---|---|---|---|
| 2014/0157441 A1* | 6/2014 | Georgiev | G06F 16/84 |
| | | | 726/32 |
| 2020/0250338 A1* | 8/2020 | Mcfall | H04L 9/0643 |
| 2022/0131683 A1 | 4/2022 | Choi | |
| 2023/0359770 A1* | 11/2023 | Mcfall | H04L 9/3247 |

OTHER PUBLICATIONS

International Searching Authority, "Written Opinion of the International Searching Authority," issued in connection with International Patent Application No. PCT/US2025/021800, mailed on Jul. 7, 2025, 4 pages.

\* cited by examiner

| PRODUCT ID | SALES VALUE | SALES UNIT | AVG. NUMBER OF STORES SELLING | BASELINE SALES VALUE | BASELINE SALES UNIT |
|---|---|---|---|---|---|
| 21 | 220.024 | 63 | 37 | 319.841 | 77 |
| 19 | 107.773 | 102 | 28 | 150.806 | 65 |
| 32 | 326.729 | 180 | 1 | 142.185 | 51 |
| 93 | 266.707 | 118 | 17 | 286.847 | 143 |
| 18 | 7 | 120 | 1 | 316.134 | 76 |
| 2 | 19.765 | 106 | 42 | 117.251 | 3 |
| 92 | 168.464 | 164 | 38 | 7 | 59 |
| 38 | 307.412 | 106 | 27 | 426.057 | 8 |
| 65 | 130.044 | 142 | 16 | 549.702 | 64 |
| 27 | 155.157 | 97 | 15 | 321.449 | 133 |

|  | PRODUCT ID | SALES VALUE | SALES UNIT | AVG. NUMBER OF STORES SELLING | BASELINE SALES VALUE | BASELINE SALES UNIT |
|---|---|---|---|---|---|---|
| COUNT | 1000 | 1000 | 1000 | 1000 | 1000 | 1000 |
| MEAN | 48.973 | 256.5951614 | 116.677 | 20.385 | 232.6433645 | 89.076 |
| STD | 28.77815931 | 167.1533208 | 55.48595644 | 11.83464549 | 146.2485205 | 40.58091959 |
| MIN | 1 | 7 | 2 | 1 | 7 | 2 |
| 25% | 23.75 | 128.4246949 | 76 | 11 | 119.4915941 | 62 |
| MEDIAN | 50 | 251.9071201 | 116 | 20 | 230.9872021 | 87 |
| 75% | 73 | 374.8269241 | 154 | 28.25 | 327.6913024 | 117 |
| MAX | 99 | 845.5231355 | 286 | 59 | 650.673696 | 216 |

401　402　404　406　408　410　412
414　416　418　420

| PROD ID | AVG. # OF STORES SELLING | BASELINE SALES UNIT | ROW_HASH | HASH_MOD_GAMMA | BASELINE SALES VALUE_HASH | BASELINE SALES VALUE | BASELINE SALES VALE_POS | ALTERATION TYPE | BASELINE SALES_NEW_VALUE | BASELINE SALES CHANGED? | BASELINE SALES VALUE_DECODED_BIT |
|---|---|---|---|---|---|---|---|---|---|---|---|
| 21 | 37 | 77 | 9138536658 | TRUE | -162319114 | 319.841 | 14 | 0 | 319.84 | TRUE | 0 |
| 19 | 28 | 65 | 6522919724 | FALSE | 7180475633 | 150.806 | 17 | 1 | 150.806 | FALSE | 0 |
| 32 | 1 | 51 | -219467524 | FALSE | -259084133 | 142.185 | 21 | 0 | 142.185 | FALSE | 1 |
| 93 | 17 | 143 | -125534291 | FALSE | -869057434 | 286.847 | 14 | 0 | 286.847 | FALSE | 1 |
| 18 | 1 | 76 | 5217874809 | TRUE | 3280912361 | 316.134 | 17 | 1 | 316.135 | TRUE | 1 |
| 2 | 42 | 3 | 4408275256 | FALSE | 2694251895 | 117.251 | 15 | 1 | 117.251 | FALSE | 1 |
| 92 | 38 | 59 | -326517307 | FALSE | 2632403226 | 7 | 18 | 0 | 7 | FALSE | 0 |
| 38 | 27 | 8 | -557519999 | FALSE | 7724920723 | 426.057 | 19 | 1 | 426.057 | FALSE | 1 |
| 65 | 16 | 64 | -233828820 | TRUE | 8484577905 | 549.702 | 9 | 1 | 549.703 | TRUE | 1 |
| 27 | 15 | 133 | -113072785 | FALSE | -696416891 | 321.449 | 13 | 0 | 321.449 | FALSE | 0 |
| 87 | 28 | 175 | 6456563439 | TRUE | -904830818 | 162.157 | 22 | 0 | 162.156 | TRUE | 0 |
| 83 | 32 | 101 | -237227302 | FALSE | -396136609 | 121.858 | 23 | 1 | 121.858 | FALSE | 0 |
| 96 | 34 | 181 | 6653913117 | TRUE | -323878460 | 188.105 | 4 | 1 | 188.105 | FALSE | 1 |
| 54 | 25 | 128 | -257637039 | TRUE | -340109423 | 234.879 | 1 | 1 | 234.879 | FALSE | 1 |
| 38 | 27 | 122 | 3343693419 | TRUE | -906381959 | 152.008 | 1 | 1 | 152.009 | TRUE | 1 |
| 87 | 21 | 68 | -515188862 | TRUE | 3390942629 | 283.325 | 5 | 1 | 283.325 | FALSE | 1 |
| 49 | 44 | 119 | -467168862 | TRUE | -800782407 | 258.037 | 9 | 1 | 258.037 | FALSE | 1 |
| 29 | 30 | 118 | 6421118028 | TRUE | 7209575850 | 199.669 | 18 | 0 | 199.668 | FALSE | 0 |
| 34 | 6 | 46 | 2881112784 | TRUE | -637507761 | 334.932 | 15 | 1 | 334.933 | TRUE | 1 |
| 79 | 50 | 99 | 7471244350 | FALSE | -866188597 | 396.6 | 11 | 0 | 396.6 | FALSE | 0 |

METHODS, SYSTEMS, ARTICLES OF MANUFACTURE AND APPARATUS TO PROTECT DATASETS

FIELD OF THE DISCLOSURE

This disclosure relates generally to data security and, more particularly, to methods, systems, articles of manufacture and apparatus to protect datasets.

BACKGROUND

Market researchers capture information related to diverse subject matter types. Each subject matter type may be from many different. Market researchers and data aggregators take great efforts in finding such information, analyzing the information, and/or processing the information.

BRIEF DESCRIPTION OF THE DRAWINGS

FIG. 3 is an example dataset that is protected by the example dataset security circuitry of FIGS. 1 and 2.

FIG. 6 is an example row analysis table generated by the example dataset security circuitry of FIGS. 1 and 2.

In general, the same reference numbers will be used throughout the drawing(s) and accompanying written description to refer to the same or like parts. The figures are not necessarily to scale.

DETAILED DESCRIPTION

Figure 1:
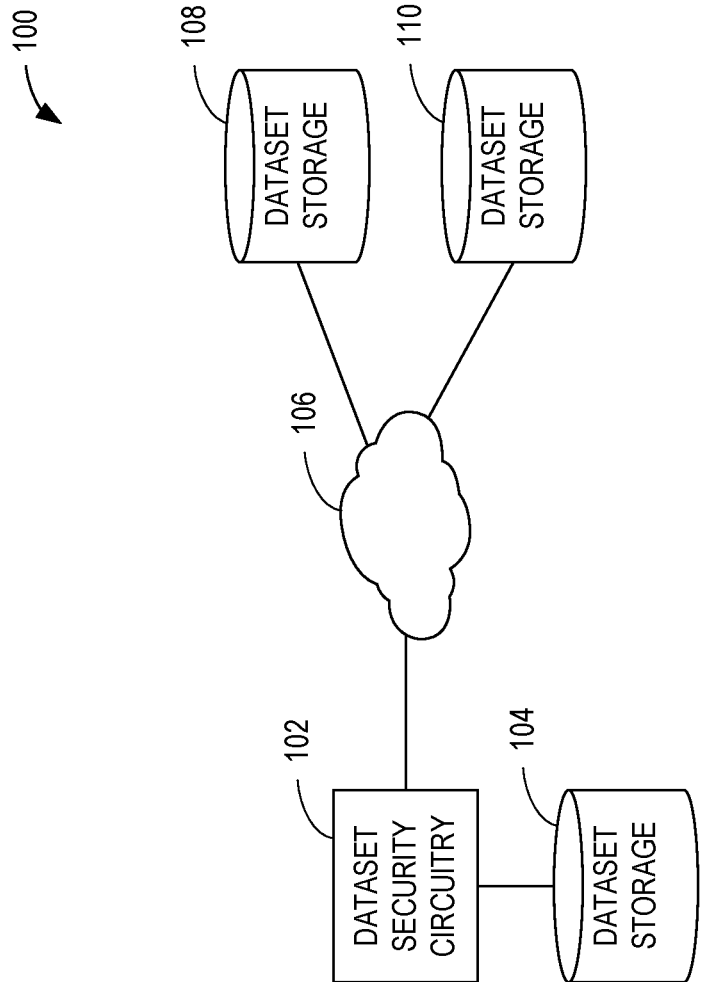
FIG. 1 is a block diagram of an example environment in which example dataset security circuitry constructed in accordance with teachings of this disclosure operates to protect datasets.

Creators of datasets (e.g., data analysts, market researchers, model research scientists, etc.) dedicate substantial resources to acquire data from any number of sources before performing operations on such data to derive knowledge, such as conclusions and/or explanations of physical phenomenon, behaviors, and resultant effects of those behaviors. In some circumstances, the datasets are the result of expensive investment in data collection, technological systems to cultivate the collected data, and innovative techniques to process the collected and/or cultivated data that results in a valuable asset (e.g., dataset) that can be sold or licensed to recuperate the substantial investments used to produce the dataset.

In view of the value that cultivated datasets represent, examples disclosed herein include efforts to maintain the integrity and ownership of such datasets. Ownership and control of the datasets help to ensure commercial viability of the entities (e.g., data analysts, market research entities, medical research, scientific research, etc.) so that beneficial contributions to society will continue. However, datasets may be distributed in an unauthorized manner that bypasses sales and/or licensing mechanisms that would otherwise fund the continued development of these assets. Examples disclosed herein include techniques to protect datasets by altering them in a manner that permits identification of unauthorized distribution instances.

While traditional techniques of securing data, such as datasets, include the use of encryption, benefits of such techniques are limited to prevention of unauthorized access. Ultimately, when one or more datasets are legitimately licensed, sold or otherwise shared, the encryption techniques are either removed or decryption keys are provided to the purchaser/licensee. Stated differently, the previously encrypted datasets are transformed into a cleartext format that may be re-distributed in an unauthorized manner.

Examples disclosed herein include a watermark (e.g., a digital watermark) in the dataset to be protected. As used herein, a watermark includes a code or string of data that may be applied to an original dataset to be protected. The watermark is not inherent to the original object (dataset), but is added to the original object to allow later identification of the dataset. In the event the augmented dataset is later distributed in an unauthorized manner (e.g., the dataset is detected on a website or other data source), the watermark identifies the dataset as originating with the entity that applied the watermark. Examples disclosed herein embed watermark information in a dataset in a manner that is imperceptible to an end-user of the dataset, but still provides information to permit ownership and/or source identification to enable identification of distribution of and/or tampering with the dataset (e.g., removal or addition of rows in the legitimately distributed dataset). Examples disclosed herein consider trade-offs between watermark strength and a preservation of utility of the dataset.

Examples disclosed herein consider data in a star schema format, but examples are not limited thereto. Example star schema arrangements include dimension tables that describe factual groupings, such as a product dimension including facts related to products and/or categories, or a market dimension including facts related to particular retailers of a region of interest. Any number of dimensions (dimension tables) relate to a fact table that stores particular facts, such as observations or events (e.g., sales, price, etc.). The facts may be of any type. Numerical examples disclosed herein include integers and float values (e.g., single-precision floating-point, double-precision floating-point, etc.). Float values may include any number of significant bits and, as such, alteration of least significant bits of a fact have a lower numerical impact than alteration of more significant bits.

Examples disclosed herein consider such numerical impacts so that a numerical deviation of any alteration is reduced while still maintaining an ability to detect unauthorized distribution of a dataset.

A fact table in a star schema includes keys (e.g., primary keys, foreign keys), such as a product ID key, a time ID key, a period ID key, etc. Each key may include any number of facts, such as a sales units fact of the product ID key (e.g., an integer of a number of units sold), or a sales price fact of the product ID key (e.g., a float value of a price or average sales price of a product). Because unauthorized use and/or distribution of a dataset is expected to remove and/or otherwise alter one or more keys of the dataset, example dataset alterations disclosed herein focus on facts of the dataset, as described in further detail below.

FIG. 1 is an example dataset protection system 100 including example dataset security circuitry 102 constructed in accordance with teachings of this disclosure. The dataset security circuitry 102 of this example is communicatively connected to an example local dataset storage 104 and an example network 106. The example network 106 is communicatively connected to any number of additional dataset storage devices, such as an example dataset storage 108 and an example dataset storage 110. The example first dataset storage 104, the example second dataset storage 108 and/or the example third dataset storage 110 include any number of datasets that are to be protected by examples disclosed herein or to be analyzed by examples disclosed herein to determine if such datasets have been redistributed in an unauthorized manner.

Figure 2:
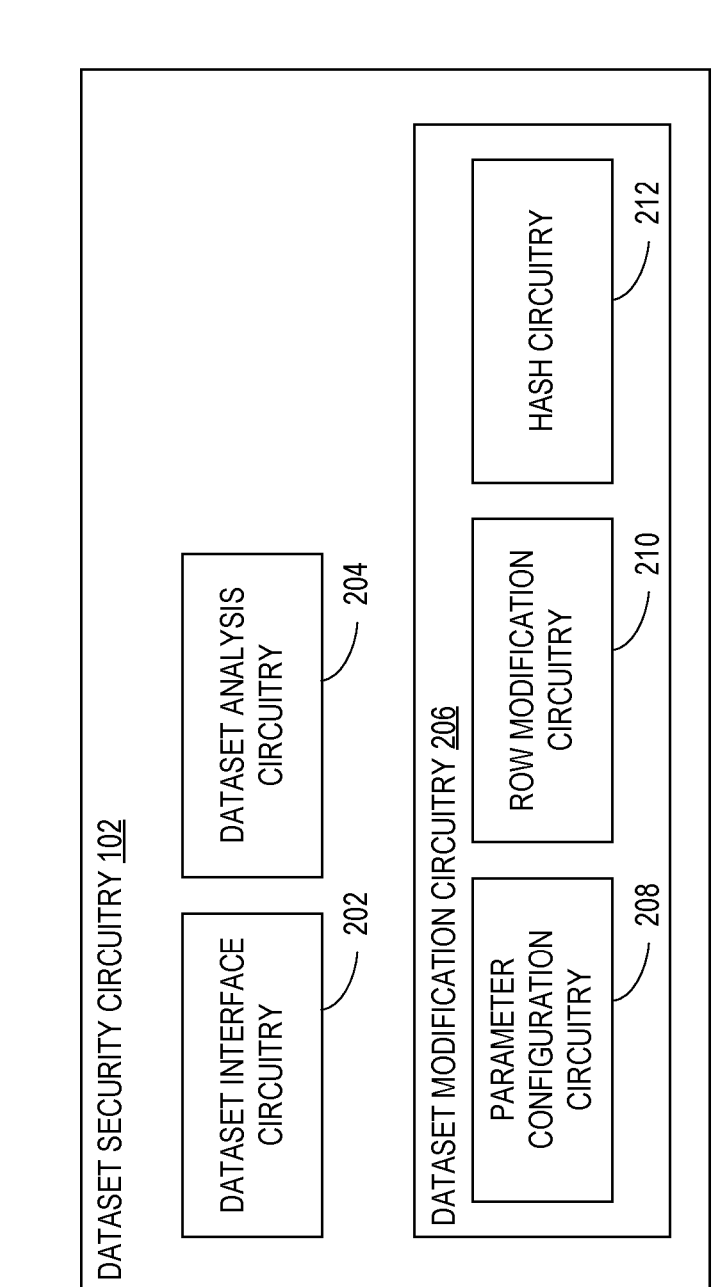
FIG. 2 is a block diagram of an example implementation of the dataset security circuitry of FIG. 1.

FIG. 2 is a block diagram of an example implementation of the dataset security circuitry 102 of FIG. 1 to protect datasets. The dataset security circuitry 102 of FIG. 2 may be instantiated (e.g., creating an instance of, bring into being for any length of time, materialize, implement, etc.) by programmable circuitry such as a Central Processor Unit (CPU) executing first instructions. Additionally or alternatively, the dataset security circuitry 102 of FIG. 2 may be instantiated (e.g., creating an instance of, bring into being for any length of time, materialize, implement, etc.) by (i) an Application Specific Integrated Circuit (ASIC) and/or (ii) a Field Programmable Gate Array (FPGA) structured and/or configured in response to execution of second instructions to perform operations corresponding to the first instructions. It should be understood that some or all of the circuitry of FIG. 2 may, thus, be instantiated at the same or different times. Some or all of the circuitry of FIG. 2 may be instantiated, for example, in one or more threads executing concurrently on hardware and/or in series on hardware. Moreover, in some examples, some or all of the circuitry of FIG. 2 may be implemented by microprocessor circuitry executing instructions and/or FPGA circuitry performing operations to implement one or more virtual machines and/or containers.

In the illustrated example of FIG. 2, the dataset security circuitry 102 includes example dataset interface circuitry 202, example dataset analysis circuitry 204, and example dataset modification circuitry 206. The example dataset modification circuitry 206 includes example parameter configuration circuitry 208, example row modification circuitry 210, and example hash circuitry 212.

In some examples, the dataset security circuitry 102 is instantiated by programmable circuitry executing dataset security instructions and/or configured to perform operations such as those represented by the flowchart(s) of FIGS. 7-11. In some examples, the dataset interface circuitry 202 is instantiated by programmable circuitry executing dataset security instructions and/or configured to perform operations such as those represented by the flowchart(s) of FIG. 7. In some examples, the dataset analysis circuitry 204 is instantiated by programmable circuitry executing dataset security instructions and/or configured to perform operations such as those represented by the flowchart(s) of FIGS. 7-11. In some examples, the dataset modification circuitry 206 is instantiated by programmable circuitry executing dataset security instructions and/or configured to perform operations such as those represented by the flowchart(s) of FIGS. 7-11. In some examples, the parameter configuration circuitry 208 is instantiated by programmable circuitry executing dataset security instructions and/or configured to perform operations such as those represented by the flowchart(s) of FIG. 9. In some examples, the row modification circuitry 210 is instantiated by programmable circuitry executing dataset security instructions and/or configured to perform operations such as those represented by the flowchart(s) of FIGS. 8, 10 and 11. In some examples, the hash circuitry 212 is instantiated by programmable circuitry executing dataset security instructions and/or configured to perform operations such as those represented by the flowchart(s) of FIG. 10.

In some examples, the dataset security circuitry 102 includes means for interfacing with a dataset. For example, the means for interfacing with a dataset may be implemented by dataset interface circuitry 202. In some examples, the dataset security circuitry 102 includes means for analyzing a dataset. For example, the means for analyzing a dataset may be implemented by dataset analysis circuitry 204. In some examples, the dataset security circuitry 102 includes means for modifying a dataset. For example, the means for modifying a dataset may be implemented by dataset modification circuitry 206. In some examples, the dataset security circuitry 102 includes means for configuring parameters. For example, the means for configuring parameters may be implemented by parameter configuration circuitry 208. In some examples, the dataset security circuitry 102 includes means for modifying rows. For example, the means for modifying rows may be implemented by row modification circuitry 210. In some examples, the dataset security circuitry 102 includes means for hashing. For example, the means for hashing may be implemented by hash circuitry 212. In some examples, one or more of the dataset security circuitry 102, the dataset interface circuitry 202, the dataset analysis circuitry 204, the dataset modification circuitry 206, the parameter configuration circuitry 208, the row modification circuitry 210, and the hash circuitry 212 may be instantiated by programmable circuitry such as the example programmable circuitry 1212 of FIG. 12. For instance, the aforementioned circuitry may be instantiated by the example microprocessor 1300 of FIG. 13 executing machine executable instructions such as those implemented by one or more blocks of FIGS. 7-11. In some examples, the condition determination circuitry may be instantiated by hardware logic circuitry, which may be implemented by an ASIC, XPU, or the FPGA circuitry 1400 of FIG. 14 configured and/or structured to perform operations corresponding to the machine readable instructions. Additionally or alternatively, the aforementioned circuitry may be instantiated by any other combination of hardware, software, and/or firmware. For example, the aforementioned circuitry may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) configured and/or structured to execute some or all of the machine readable instructions and/or to perform some or all of the operations corresponding to the machine readable instructions without executing software or firmware, but other structures are likewise appropriate.

In operation, the example dataset interface circuitry 202 retrieves and/or otherwise accesses a dataset to be protected. The dataset may be accessed from one or more of the local dataset storage 104, the dataset storage 108, the dataset storage 110 and/or any other network-accessible location having one or more datasets. The example dataset analysis circuitry 204 parses the dataset to identify facts, dimensions, tables and keys associated with the selected dataset. As used herein, a "fact" can be data in a numeric format or an alphanumeric format, such as an integer value or a float value. As used herein, "facts" are referred to as "attributes" of a row of data within the dataset. The datasets analyzed by examples disclosed herein may include any number of attributes. The dataset analysis circuitry 204 selects an attribute within the dataset and determines one or more properties and/or characteristics of the selected attribute. For instance, the dataset analysis circuitry 204 determines whether the attribute is an integer (e.g., a number without a decimal point) as distinguished from a floating point number having a quantity of significant digits after a decimal point. As described above, examples disclosed herein consider the type of attribute to improve a balance between dataset protection and dataset usability. Generally speaking, an attribute that is modified in a particular manner to embed information into the dataset indicative of improper re-distribution or theft of the dataset may also have varying effects on the ability to use data within the dataset for its intended purpose.

To illustrate, consider a first attribute having an integer value of 10. Also consider that the value of 10 is one value in a column of five values that, when added together yields derivable information to the user of the dataset (e.g., an average price value). If the value of 10 is modified by a value of +/−2 in an effort to show that a subsequent user of the dataset has improperly acquired the data, then that value includes a 20% error, which may further disturb a utility of the dataset when the remaining four other values are considered (e.g., a sum value of all five values now exhibits an error). On the other hand, consider a second attribute having a decimal value of 10.421. Also consider that the value of 10.421 is one value in a column of five values that, when added together yields derivable information to the user of the dataset. If the least significant bit of the decimal value is modified by +/−2 in an effort to show that a subsequent user of the dataset has improperly acquired the data, then the corresponding error of the modified value is substantially less.

If the selected attribute is an integer, the example dataset analysis circuitry 204 determines if the selected fact satisfies (e.g., is greater than) an accepted sensitivity threshold. Briefly returning to the example above where the first attribute has an integer value of 10 and the deviation is +/−1, thereby representing a 10% variation of the original value. If the accepted sensitivity threshold is, for example, not to exceed 5%, then the dataset analysis circuitry 204 designates the selected attribute as non-alterable. On the other hand, if a second selected attribute has an integer value of 100 and the deviation is +/−1, then the variation of the original value is only 1%. In that example circumstance, the dataset analysis circuitry 204 designates the selected attribute as an alteration candidate. A similar analysis occurs for all attributes of a selected dataset, in which every attribute will be designated and/or otherwise labeled with an alteration flag of either an alteration candidate (e.g., alteration flag=TRUE) or a non-alteration fact (e.g., alteration flag=FALSE).

In some examples, the dataset analysis circuitry 102 performs a transformation (a binary transformation) of a candidate attribute from its native type (e.g., integer, floating point) to binary. The dataset analysis circuitry 102 transforms any type of numeric type, such as single-precision floating-point formats, double-precision floating-point formats, etc. As described in further detail below, performing a binary transformation of the candidate attribute permits selection of particular bits to be modified in a manner associated with a unique watermark value (W) (e.g., "NIQ"). Depending on the unique watermark value (W), only particular bits (e.g., the least significant bit (LSB), a first and third LSB, etc.) are modified, thereby allowing subsequent discovery of unauthorized re-distribution of the dataset in the field.

For example, if a candidate attribute value is a floating-point value of 123.456, the dataset analysis circuitry 102 rounds the number to remove the three (3) decimal positions via a multiplication factor (e.g., 123.456*1000 rounds to 123456). Stated differently, the dataset analysis circuitry 102 transforms the floating-point value to the integer value 123456, and then transforms the integer value to a binary value (123456 is equivalent to binary 0001-1110-0010-0100-0000). Based on the unique watermark value (W), the position(s) to encode may correspond to the last two (2) significant digits, which are currently zero (0). If the last two (2) significant digits are changed from zero (0) to one (1), the resulting binary value determined by the dataset analysis circuitry 102 is 0001-1110-0010-0100-0011, which corresponds to a decimal integer value 123459. The dataset analysis circuitry 102 reverse-transforms to the original decimal format (e.g., by dividing the value by 1000) to result in 123.459.

The example dataset modification circuitry 206 of FIG. 2 embeds one or more alterations in the selected dataset by invoking the example parameter configuration circuitry 208 to configure embedding parameters and invoking the row modification circuitry 210 to alter one or more rows of the dataset, as described in further detail below.

To configure embedding parameters for a dataset of interest, the parameter configuration circuitry 208 selects watermark data (W) to be associated with and/or otherwise integrated with the selected dataset. The watermark data may be an alphanumeric phrase. To illustrate, the watermark data selected, retrieved and/or otherwise received by the parameter configuration circuitry 208 is a three character string "NIQ". The parameter configuration circuitry 208 transforms the watermark data to an ASCII (American Standard Code for Information Interchange) value. While examples disclosed herein include ASCII, alternatives may be used without limitation, such as Unicode, UTF-8, etc.

Figure 5:
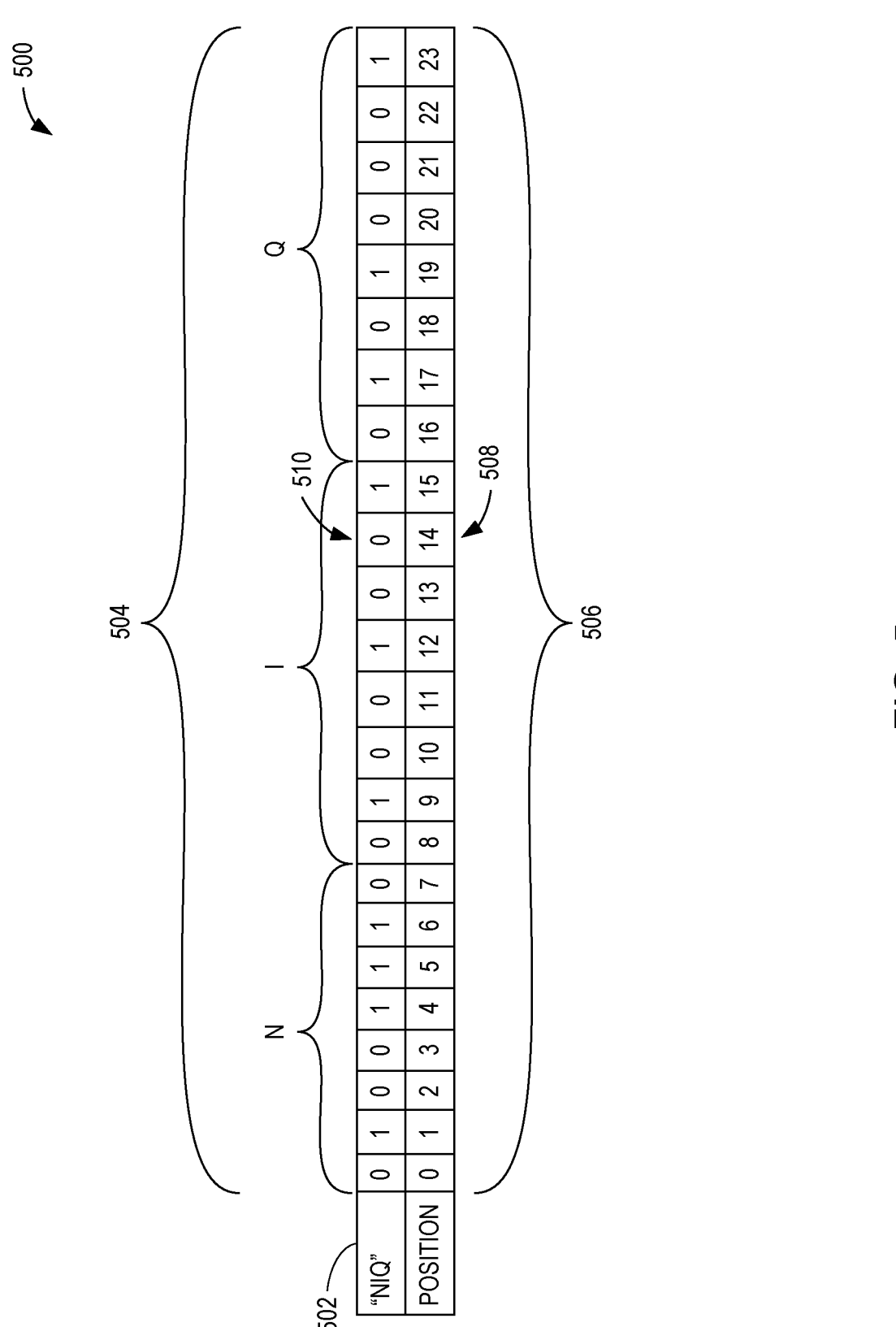
FIG. 5 is an example transformation table generated by the example dataset security circuitry of FIGS. 1 and 2.

Briefly turning to the illustrated example of FIG. 5, a transformation table 500 includes example watermark data 502 (e.g., "NIQ"), an ASCII transformation 504 of the watermark data 502 in which the ASCII transformation 504 includes bit values of either "1" or "0." The transformation table 500 also includes position values 506 corresponding to respective transformation bit values of the ASCII transformation 504. The ASCII transformation 504 includes bit values corresponding to the text-to-ASCII translated watermark data 502. In the illustrated example of FIG. 5, the parameter configuration circuitry 208 transformed the character "N" from the watermark data 502 to its ASCII representation of 01001110, transformed the character "I" to its ASCII representation of 01001001, and transformed the character "Q" to its ASCII representation of 01010001. The parameter configuration circuitry 208 also determines and/or otherwise calculates a length of the ASCII value corresponding to the watermark data, which in the example of FIG. 5 is 24 bits. The example parameter configuration circuitry 208 selects, retrieves, receives and/or otherwise obtains a secret key, which may be a string or passphrase (e.g., "secret"), which is used in one or more hash calculations.

Examples disclosed herein modify one or more rows of a dataset, and a proportion of the rows of the dataset to be modified/altered is determined by, in part, a gamma (γ) value. For example, a gamma value of 3 causes 1/γ (33.33%) of the rows to be altered in the dataset, as described in further detail below. The example parameter configuration circuitry 208 also selects a number of least significant bits (LSBs) to be used for alteration. For example, an attribute value with three significant digits (e.g., 10.123) may be modified and/or otherwise altered by examples disclosed herein via alteration of one or more of the bits corresponding to a binary representation of the float value, as described above. For instance, each position of the binary representation is a value of 2 powered to that position (e.g., a binary representation of 13 is 1101 where $2^3+2^2+1$ equals 13).

FIG. 3 is an example dataset 300 that may be protected by examples disclosed herein in a manner that allows subsequent analysis of the dataset 300 to determine that unauthorized distribution of the dataset 300 has occurred. In the illustrated example of FIG. 3, the dataset 300 includes a product ID column 302, a sales value column 304, a sales unit column 306, an average number of stores selling column 308, a baseline sales value column 310, and a baseline sales unit column 312. The example dataset 300 of FIG. 3 includes any number of rows, each of which includes attributes (facts) corresponding to the respective column. For instance, a first row 314 represents product ID 21, which has a corresponding sales value of 220.024 (e.g., a float number with three decimal positions), a corresponding sales unit value of 63 (e.g., an integer), a corresponding average number of stores selling value of 37 (e.g., an integer), a corresponding baseline sales value of 319.841 (e.g., a float number with three decimal positions), and a corresponding baseline sales unit value of 77 (e.g., an integer).

As described above, the dataset 300 of FIG. 3 may be the result of tedious data acquisition effort and/or computation by an owner/creator. Substantial time and resources may have been invested into the creation of the dataset 300 in such a manner that it has a value for licensing and/or selling of the information within the dataset 300. As such, in the event the dataset 300 is sold to a first purchaser in an authorized manner, subsequent sales by that first purchaser are not authorized and represent an informational theft. Examples disclosed herein enable unique identification of the dataset 300 in a manner that allows it to be identified as an unauthorized reproduction, and allows one or more identifiers to help determine the entity responsible for the unauthorized re-distribution of the dataset 300.

Figure 4:
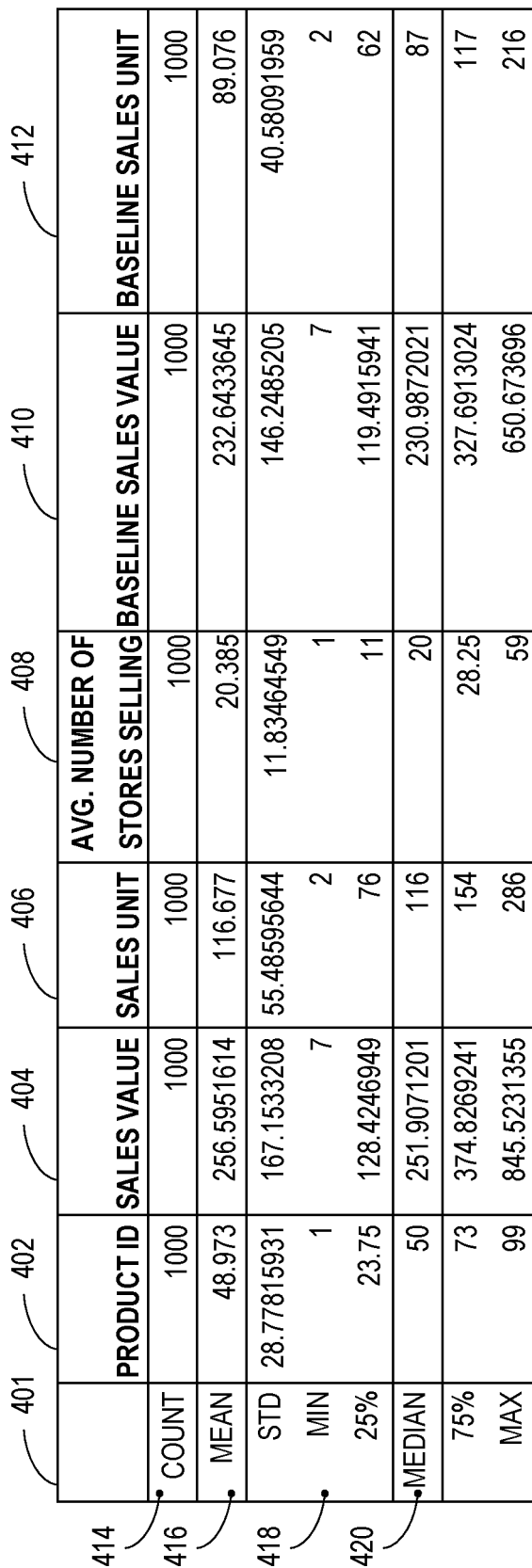
FIG. 4 is a table of example statistics corresponding to the dataset of FIG. 3 that are generated by the example dataset security circuitry of FIGS. 1 and 2.

FIG. 4 is an example statistics table 400 of the dataset 300 of FIG. 3. While the dataset 300 of FIG. 3 includes ten (10) rows of attributes, the example statistics table 400 of FIG. 4 considers a larger portion of the dataset 300 having one-thousand (1000) rows. In the illustrated example of FIG. 4, the table 400 includes a statistics type column 401, a product ID column 402, a sales value column 404, a sales unit column 406, an average number of stores selling column 408, a baseline sales value column 410, and a baseline sales unit column 412. Similar to the dataset 300 of FIG. 3, each column includes a particular type of attribute (e.g., a float type or an integer type), for which a count statistic 414 is calculated, a mean statistic 416 is calculated, a standard deviation statistic 418 is calculated, and a median statistic 420 is calculated. The example statistics table 400 enables consideration of the uniqueness of each dataset when determining how much or how little to alter the attributes (e.g., sometimes referred to as a sensitivity consideration) of the table so that future detection of re-distribution is possible while reducing a mathematical effect of the table's utility to would-be purchasers of the dataset 300. For example, if an original dataset is altered in a manner in which individual attributes deviate with a first magnitude that is relatively greater than alteration in a manner in which the individual attributes deviate relatively less, then future identification of possible re-distribution will be more evident. However, those relatively greater alteration magnitudes will cause correspondingly greater errors when end users apply the attributes to one or more statistical operations (e.g., mean values will include greater error).

As such, the example statistics table 400 determines any number of statistics of the original dataset 300 to serve as guidepost values that can be used to set sensitivity magnitudes when altering an original dataset. For example, FIG. 4 includes (a) a median value for the sales unit attribute as "116," (b) a median value for the average number of stores selling attribute as "20," and the baseline sales unit attribute as "87." All three of the above-identified attributes are of type integer. Consider an accepted noise value is 100 units based on the median statistic, then examples disclosed herein designate the sales unit attribute as a candidate attribute to be altered because its median value is greater than the accepted noise value. However, examples disclosed herein designate the average number of stores selling attribute and the baseline sales unit attribute as non-alterable attributes because their median values are less than the accepted noise value.

After the configuration parameters, such as the above-identified sensitivity magnitude, the watermark data, the transformed watermark data (e.g., into an ASCII format), the secret key, and the gamma (γ) value are established and/or otherwise determined, examples disclosed herein alter one or more attributes within particular rows of a dataset. The example row modification circuitry 210 selects a row of the dataset to analyze, in which a determination is made as to whether the row is a proper candidate for alteration based on the configuration parameters. To illustrate, consider an example row analysis table 600 of FIG. 6.

In the illustrated example of FIG. 6, attribute columns similar to those described above in connection with FIG. 3 include a product ID column 602, an average number of stores selling attribute column 608, a baseline sales unit attribute column 612, and a baseline sales value attribute column 610. Attribute values in the aforementioned attribute columns are the same as the similar attribute columns of FIG. 3. The illustrated example of FIG. 6 also includes a row hash column 620, a hash modulo gamma column 622, a baseline sales value hash column 624, a baseline sales value position column 626, an alteration type column 628, a baseline sales new value column 630, a baseline sales changed column 632, and a baseline sales value decoded bit column 634.

For a first selected row 636, the example hash circuitry 212 calculates a row hash value 638 based on (a) attributes therein that are designated as non-alterable and (b) the secret key. In some examples, the secret key is selected and/or otherwise assigned in a unique manner based on a purchaser or licensee of the dataset. As such, if particular characteristics of a suspected unauthorized dataset are discovered in the field, examples disclosed herein permit a match to the purchaser/licensee version of the dataset. Additionally or alternatively, in some examples the same secret key may be used for two or more authorized distributions of the dataset. In such circumstances, different embedded messages are used to permit a match to the purchaser/licensee version of the dataset and the improperly re-distributed version of the dataset. As such, the one or more parties/entities responsible for unauthorized re-distribution may be identified.

The non-alterable attributes of the first row 620 include the product ID attribute value (e.g., "21"), the average number of stores selling attribute value (e.g., "37"), and the baseline sales unit attribute value (e.g., "77"). The hash circuitry 212 uses the non-alterable attribute values and the secret key (e.g., "secret," or "Entity A") to perform and/or otherwise execute a hash function to generate the row hash value 638 (e.g., "9138536658"). This particular row hash value 638 will be unique to the secret key, which is associated with a would-be purchaser/licensee of the dataset to be modified. The hash circuitry 212 calculates a modulo of the row hash value and the gamma ($\gamma$) value, which is "3" for purposes of this example. In particular, the above-described gamma value of "3" influences a portion of rows to be modified in any given dataset. The modulo of the row hash value 638 ("9138536658") and the gamma value of "3" is zero. The row modification circuitry 210 determines that any row in which the row hash modulo value equals zero (e.g., the hash modulo gamma column 622 is TRUE) is to alter attributes therein, whereas any row in which the row hash modulo value is non-zero (e.g., the hash modulo gamma column 622 is FALSE) means the attributes within the row are to be left unaltered.

Continuing with the analysis of example first row 636, because the row has been designated to have its corresponding attributes altered (e.g., because the modulo value equals zero), the row modification circuitry 210 selects a candidate attribute that was previously designated as a candidate for alteration. That is, an attribute value that is a floating-point or an integer that satisfies a sensitivity threshold value. In the illustrated example of FIG. 6, a numeric representation of a header ("Baseline Sales Value") of the baseline sales value column 610 and the row hash value 638 is hashed by the hash circuitry 212 to generate an attribute hash value 642 (sometimes referred to herein as an attribute hash). The hash circuitry 212 may use any hashing algorithm to generate the attribute hash value 642. Worth noting is that the secret key affects several different characteristics of the dataset to be altered. In particular, because it is a parameter used with the row hash value 638, the security key affects which particular rows of the dataset will be altered. Additionally, because the attribute hash value 642 is a function of the row hash value, the secret key affects the manner of alteration of attributes within each row in a unique manner. As such, if the same dataset is altered in view of (a) a first secret key associated with a first would-be purchaser/licensee and (b) a second secret key associated with a second would-be purchaser/licensee, then later analysis of a leaked dataset in the field may be matched with the entity/licensee responsible for unauthorized re-distribution.

As described above, the dataset analysis circuitry 102 performs a transformation of each attribute to be altered (e.g., a binary transformation). For example, the dataset analysis circuitry 102 transforms a baseline sales value attribute of 319.841 (a floating-point value) to an integer value to yield 319841. The dataset analysis circuitry 102 transforms the integer value to binary, and then determines which bit or plurality of bits are to be altered. After those particular bit or plurality of bits are altered, the dataset analysis circuitry 102 re-transforms the binary value back to an integer, and then transforms the integer back to its initial floating-point representation.

The hash circuitry 212 calculates a bit alteration value (e.g., the particular bit of the original attribute to be altered, such as the LSB of a binary representation of the attribute) based on the attribute hash modulo of Epsilon ($\varepsilon$), which may be one of the selected and/or otherwise designated embedding parameters described above. For the sake of this example, consider Epsilon ($\varepsilon$) to have a value of 1, which results in a modulo value of zero for any applied attribute hash value. The effect of the modulo result designates whether the LSB or a different position of the binary representation of the attribute value is to be altered.

In this example, 1 designates the LSB is to be altered. In some examples, a particular significant digit of the attribute value is selected as a value to alter. The hash circuitry 212 also calculates an alteration type, in which an alteration type for any attribute to be altered is either type "even" or type "odd." An even alteration type means that the altered attribute value must be an even number, and an odd alteration type means that the altered attribute value must be an odd number. The alteration type is based on the attribute hash modulo and the length of the ASCII watermark data, which is "24" in this example (e.g., the watermark data "NIQ" is 3 characters in length, in which each character is represented by an 8-bit ASCII code). As such, the attribute hash value 642 "−162319114" modulo 24 is a value of 14 (see element 644). The value of the modulo operation (e.g., "14" in this example) is used as a position reference from the illustrated example of FIG. 5, in which position 14 (see element 508) is associated with a bit value of zero (see element 510), which represents the alteration type to be used for the attribute value of interest.

As described above, because each bit value can either be zero (0) or one (1), a value of zero (0) represents the alteration type of "even," which causes the attribute value to be an even number after it is altered from its original value, and a value of one (1) represents an alteration type of "odd," which causes the attribute value to be an odd number after it is altered from its original value. However, in the event the original attribute value to be modified is already consistent with the even or odd type, then no modification to the attribute value is to occur, as described in further detail below.

The row modification circuitry 210 determines whether an original attribute value of interest is even or odd. In the illustrated example of FIG. 6, the row modification circuitry 210 analyzes the baseline sales value 640, which has an original (unaltered) value of "319.841," which is odd. The row modification circuitry 210 determines whether the alteration type corresponding to the attribute value of interest is a zero (0) or a (1), as shown in the alteration type column 628. As described above, because the modulo of the baseline sales hash (see element 642) in view of the length of watermark data (e.g., "24") is equal to zero (0) (see element 646), the alteration type is "even." The row modification circuitry 210 alters the original attribute value by decreasing the LSB to make the altered attribute value an even number (e.g., the original value of 319.841 is altered to 319.840).

However, consider another example in which the original value of the attribute was already an even number. In that circumstance, the row modification circuitry 210 would refrain from modifying the attribute value because it already aligns with the alteration type of "even." For example, row 648 includes an original attribute value that is of type "odd," having a value of "188.105" (see element 650 of FIG. 6). The alteration type was calculated to be a value of "1," which represents an alteration type of "odd." As such, the row modification circuitry 210 refrains from any further modifications to the attribute value, and the baseline sales new value column 630 maintains a value of "188.105" (see element 652 of FIG. 6).

While examples above determine an alteration type of "even" or "odd," some examples may limit this designation for instances in which only a single least significant bit is to be altered. However, in some examples two or more bits may be altered. For instance, when only the least significant bit of a binary representation is to be altered, then the original value may be modified by a maximum of 1. Consider an original value of 11 (an integer), which has a corresponding binary representation of 1011. If the last bit is altered to a zero, then the result is binary 1010, which is a decimal value (integer) of 10.

However, consider examples where the last two significant bits of an attribute are to be altered. This will result in a maximum difference of three (3). Again consider an original attribute value of 11 having the binary representation of 1011. Modification of the last two significant bits result in binary 1011 (decimal 11 with no modification), binary 1010 (decimal 10 when only the LSB is modified from 1 to 0), binary 1000 (decimal 8 when both LSBs are modified from their original value of 1 to 0), and binary 1001 (decimal 9). As such, in some circumstances in which two or more LSBs are modified, alteration types of "even" or "odd" may be skipped.

Each row of a dataset is analyzed in a similar manner so that attribute values may be altered. When all rows of the dataset have been analyzed, and particular attributes within each row have been altered, then the dataset may be provided to an entity and/or individual for use. However, if that entity or individual subsequently re-distributes the dataset, examples disclosed herein analyze the dataset to confirm that it was altered pursuant to the techniques described above. For example, if a dataset is suspected of being improperly re-distributed, the dataset analysis circuitry 204 analyzes attributes therein to determine integer or float types and calculates row hash values in a manner described above. The calculated row hash values are detected by the row modification circuitry 210 to generate statistics of which rows are modification candidates and which rows are not. The row modification circuitry 210 generates a list of a particular length (e.g., a length W indicative of a length of particular watermark data, such as "NIQ"). The length is compared to previously encoded datasets to determine whether they have an equal length, such as a length of 24 that would indicate watermark data having three characters of 8-bits per character.

To narrow identification and/or otherwise distinguish other possible watermark data that is also three characters in length (e.g., watermark message "NIQ" as distinguished from watermark message "NBC"), the 24 bit string is analyzed to determine a number of times a row was designated as alterable versus non-alterable. In some examples, the string is analyzed with a majority voting algorithm to generate a report with different alternatives of the watermark data (e.g., message) detected therein combined with a probability for each bit value. In some examples a probability threshold is established (e.g., a decoded bit trust value threshold of 0.8) so that the string can be compared to the dataset observed in the field versus the dataset altered by examples disclosed herein. Stated differently, if the particular rows to be modified in the dataset observed in the field match the particular rows to be modified by examples disclosed herein, then the dataset observed in the field is likely an unauthorized re-distribution event. Further verification may be performed to identify specific matches for altered rows based on the same field values.

While an example manner of implementing the dataset security circuitry 102 of FIG. 1 is illustrated in FIG. 2, one or more of the elements, processes, and/or devices illustrated in FIG. 2 may be combined, divided, re-arranged, omitted, eliminated, and/or implemented in any other way. Further, the example dataset interface circuitry 202, the example dataset analysis circuitry 204, the example dataset modification circuitry 206, the example parameter configuration circuitry 208, the example row modification circuitry 210, the example hash circuitry 212, and/or, more generally, the example dataset security circuitry 102 of FIG. 2, may be implemented by hardware alone or by hardware in combination with software and/or firmware. Thus, for example, any of the [example dataset interface circuitry 202, the example dataset analysis circuitry 204, the example dataset modification circuitry 206, the example parameter configuration circuitry 208, the example row modification circuitry 210, the example hash circuitry 212, and/or, more generally, the example dataset security circuitry 102, could be implemented by programmable circuitry in combination with machine readable instructions (e.g., firmware or software), processor circuitry, analog circuit(s), digital circuit(s), logic circuit(s), programmable processor(s), programmable microcontroller(s), graphics processing unit(s) (GPU(s)), digital signal processor(s) (DSP(s)), ASIC(s), programmable logic device(s) (PLD(s)), and/or field programmable logic device(s) (FPLD(s)) such as FPGAs. Further still, the example dataset security circuitry 102 of FIG. 2 may include one or more elements, processes, and/or devices in addition to, or instead of, those illustrated in FIG. 2, and/or may include more than one of any or all of the illustrated elements, processes and devices.

Flowchart(s) representative of example machine readable instructions, which may be executed by programmable circuitry to implement and/or instantiate the dataset security circuitry 102 of FIG. 2 and/or representative of example operations which may be performed by programmable circuitry to implement and/or instantiate the dataset security circuitry 102 of FIG. 2, are shown in FIGS. 7-11. The machine readable instructions may be one or more executable programs or portion(s) of one or more executable programs for execution by programmable circuitry such as the programmable circuitry 1212 shown in the example processor platform 1200 discussed below in connection with FIG. 12 and/or may be one or more function(s) or portion(s) of functions to be performed by the example programmable circuitry (e.g., an FPGA) discussed below in connection with FIGS. 13 and/or 14. In some examples, the machine readable instructions cause an operation, a task, etc., to be carried out and/or performed in an automated manner in the real world. As used herein, "automated" means without human involvement.

The program may be embodied in instructions (e.g., software and/or firmware) stored on one or more non-transitory computer readable and/or machine readable storage medium such as cache memory, a magnetic-storage device or disk (e.g., a floppy disk, a Hard Disk Drive (HDD), etc.), an optical-storage device or disk (e.g., a Blu-ray disk, a Compact Disk (CD), a Digital Versatile Disk (DVD), etc.), a Redundant Array of Independent Disks (RAID), a register, ROM, a solid-state drive (SSD), SSD memory, non-volatile memory (e.g., electrically erasable programmable read-only memory (EEPROM), flash memory, etc.), volatile memory (e.g., Random Access Memory (RAM) of any type, etc.), and/or any other storage device or storage disk. The instructions of the non-transitory computer readable and/or machine readable medium may program and/or be executed by programmable circuitry located in one or more hardware devices, but the entire program and/or parts thereof could alternatively be executed and/or instantiated by one or more hardware devices other than the programmable circuitry and/or embodied in dedicated hardware. The machine readable instructions may be distributed across multiple hardware devices and/or executed by two or more hardware devices (e.g., a server and a client hardware device). For example, the client hardware device may be implemented by an endpoint client hardware device (e.g., a hardware device associated with a human and/or machine user) or an intermediate client hardware device gateway (e.g., a radio access network (RAN)) that may facilitate communication between a server and an endpoint client hardware device. Similarly, the non-transitory computer readable storage medium may include one or more mediums. Further, although the example program is described with reference to the flowchart(s) illustrated in FIGS. 7-11, many other methods of implementing the example dataset security circuitry 102 may alternatively be used. For example, the order of execution of the blocks of the flowchart(s) may be changed, and/or some of the blocks described may be changed, eliminated, or combined. Additionally or alternatively, any or all of the blocks of the flow chart may be implemented by one or more hardware circuits (e.g., processor circuitry, discrete and/or integrated analog and/or digital circuitry, an FPGA, an ASIC, a comparator, an operational-amplifier (op-amp), a logic circuit, etc.) structured to perform the corresponding operation without executing software or firmware. The programmable circuitry may be distributed in different network locations and/or local to one or more hardware devices (e.g., a single-core processor (e.g., a single core CPU), a multi-core processor (e.g., a multi-core CPU, an XPU, etc.)). For example, the programmable circuitry may be a CPU and/or an FPGA located in the same package (e.g., the same integrated circuit (IC) package or in two or more separate housings), one or more processors in a single machine, multiple processors distributed across multiple servers of a server rack, multiple processors distributed across one or more server racks, etc., and/or any combination(s) thereof.

The machine readable instructions described herein may be stored in one or more of a compressed format, an encrypted format, a fragmented format, a compiled format, an executable format, a packaged format, etc. Machine readable instructions as described herein may be stored as data (e.g., computer-readable data, machine-readable data, one or more bits (e.g., one or more computer-readable bits, one or more machine-readable bits, etc.), a bitstream (e.g., a computer-readable bitstream, a machine-readable bitstream, etc.), etc.) or a data structure (e.g., as portion(s) of instructions, code, representations of code, etc.) that may be utilized to create, manufacture, and/or produce machine executable instructions. For example, the machine readable instructions may be fragmented and stored on one or more storage devices, disks and/or computing devices (e.g., servers) located at the same or different locations of a network or collection of networks (e.g., in the cloud, in edge devices, etc.). The machine readable instructions may require one or more of installation, modification, adaptation, updating, combining, supplementing, configuring, decryption, decompression, unpacking, distribution, reassignment, compilation, etc., in order to make them directly readable, interpretable, and/or executable by a computing device and/or other machine. For example, the machine readable instructions may be stored in multiple parts, which are individually compressed, encrypted, and/or stored on separate computing devices, wherein the parts when decrypted, decompressed, and/or combined form a set of computer-executable and/or machine executable instructions that implement one or more functions and/or operations that may together form a program such as that described herein.

In another example, the machine readable instructions may be stored in a state in which they may be read by programmable circuitry, but require addition of a library (e.g., a dynamic link library (DLL)), a software development kit (SDK), an application programming interface (API), etc., in order to execute the machine-readable instructions on a particular computing device or other device. In another example, the machine readable instructions may need to be configured (e.g., settings stored, data input, network addresses recorded, etc.) before the machine readable instructions and/or the corresponding program(s) can be executed in whole or in part. Thus, machine readable, computer readable and/or machine readable media, as used herein, may include instructions and/or program(s) regardless of the particular format or state of the machine readable instructions and/or program(s).

The machine readable instructions described herein can be represented by any past, present, or future instruction language, scripting language, programming language, etc. For example, the machine readable instructions may be represented using any of the following languages: C, C++, Java, C#, Perl, Python, JavaScript, HyperText Markup Language (HTML), Structured Query Language (SQL), Swift, etc.

As mentioned above, the example operations of FIGS. 7-11 may be implemented using executable instructions (e.g., computer readable and/or machine readable instructions) stored on one or more non-transitory computer readable and/or machine readable media. As used herein, the terms non-transitory computer readable medium, non-transitory computer readable storage medium, non-transitory machine readable medium, and/or non-transitory machine readable storage medium are expressly defined to include any type of computer readable storage device and/or storage disk and to exclude propagating signals and to exclude transmission media. Examples of such non-transitory computer readable medium, non-transitory computer readable storage medium, non-transitory machine readable medium, and/or non-transitory machine readable storage medium include optical storage devices, magnetic storage devices, an HDD, a flash memory, a read-only memory (ROM), a CD, a DVD, a cache, a RAM of any type, a register, and/or any other storage device or storage disk in which information is stored for any duration (e.g., for extended time periods, permanently, for brief instances, for temporarily buffering, and/or for caching of the information). As used herein, the terms "non-transitory computer readable storage device" and "non-transitory machine readable storage device" are defined to include any physical (mechanical, magnetic and/or electrical) hardware to retain information for a time period, but to exclude propagating signals and to exclude transmission media. Examples of non-transitory computer readable storage devices and/or non-transitory machine readable storage devices include random access memory of any type, read only memory of any type, solid state memory, flash memory, optical discs, magnetic disks, disk drives, and/or redundant array of independent disks (RAID) systems. As used herein, the term "device" refers to physical structure such as mechanical and/or electrical equipment, hardware, and/or circuitry that may or may not be configured by computer readable instructions, machine readable instructions, etc., and/or manufactured to execute computer-readable instructions, machine-readable instructions, etc.

Figure 7:
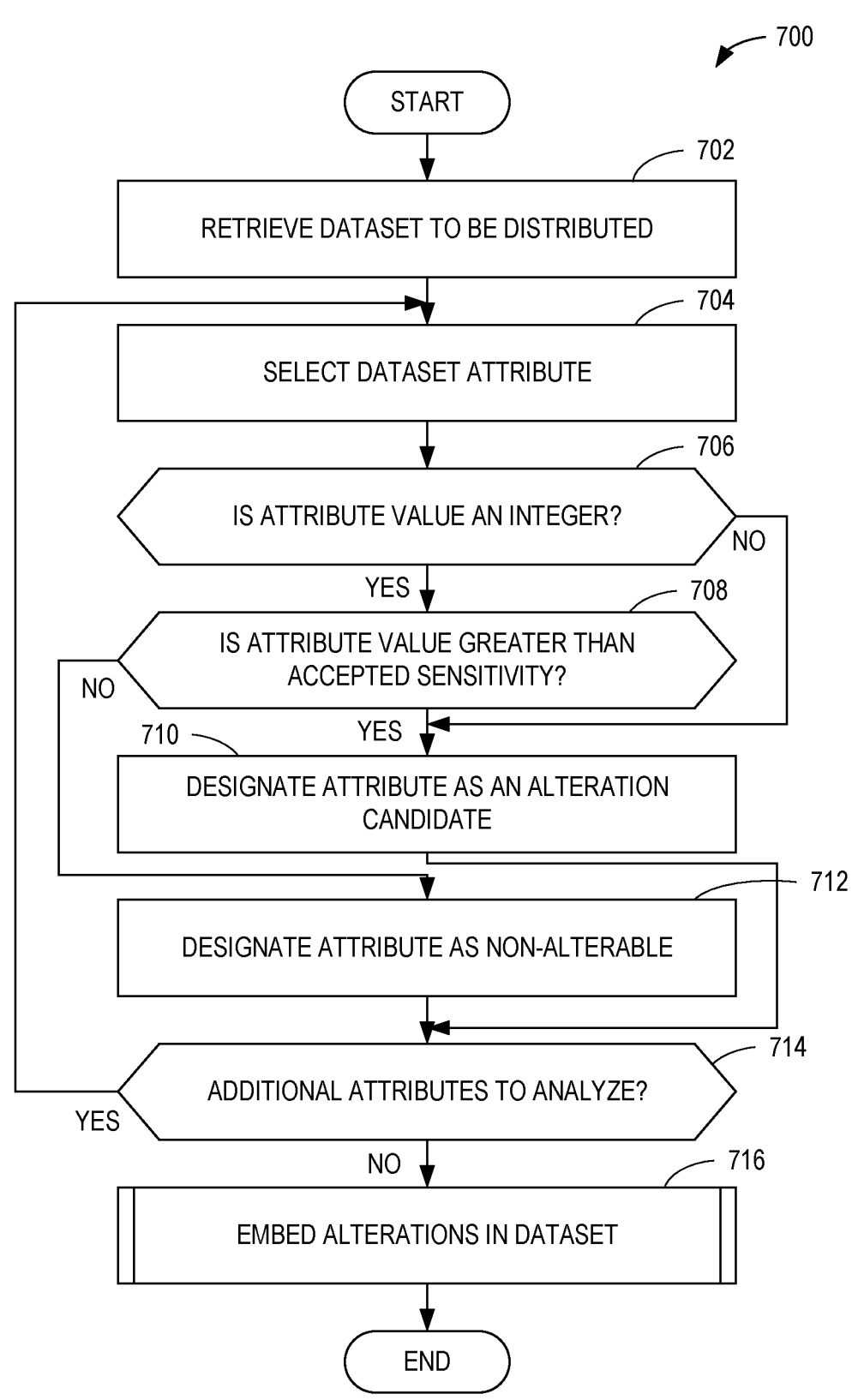
FIGS. 7-11 are flowcharts representative of example machine readable instructions and/or example operations that may be executed, instantiated, and/or performed by example programmable circuitry to implement the dataset security circuitry 102 of FIG. 2.

FIG. 7 is a flowchart representative of example machine readable instructions and/or example operations 700 that may be executed, instantiated, and/or performed by programmable circuitry to protect datasets. The example machine-readable instructions and/or the example operations 700 of FIG. 7 begin at block 702, at which the data interface circuitry 202 retrieves a dataset to be protected and/or otherwise to be distributed. As described above, a dataset may have any number of rows of data, in which the data may include attributes having values of different types (e.g., alphabetic, numeric (e.g., floats, integers), etc.). The dataset analysis circuitry 204 selects a numeric attribute (block 704) and determines whether the selected attribute is an integer (block 706). In particular, because some attributes may be alphanumeric, alphabetic or numeric, the dataset analysis circuitry 204 prevents further analysis of non-numeric attributes. Accordingly, only numeric attributes are considered for candidates to be altered. If the dataset analysis circuitry 202 determines that the selected attribute is an integer (block 706), then it determines whether the integer value is greater than an accepted sensitivity value (block 708). If so, then the selected attribute is designated as a candidate to be altered (block 710). If not, then the attribute is designated as non-alterable (block 712). In the event the dataset analysis circuitry 204 determines that the attribute is not an integer (block 706), then the attribute is deemed to be a float value and designated as an alteration candidate (block 710). The dataset analysis circuitry 204 determines whether the selected dataset includes additional attributes to analyze (block 714) and, if so, control returns to block 704 in which the dataset analysis circuitry 204 selects a next attribute within the selected dataset. When all attributes within the selected dataset have been analyzed (block 714), then the dataset modification circuitry 206 embeds one or more alterations in the dataset (block 716).

Figure 8:
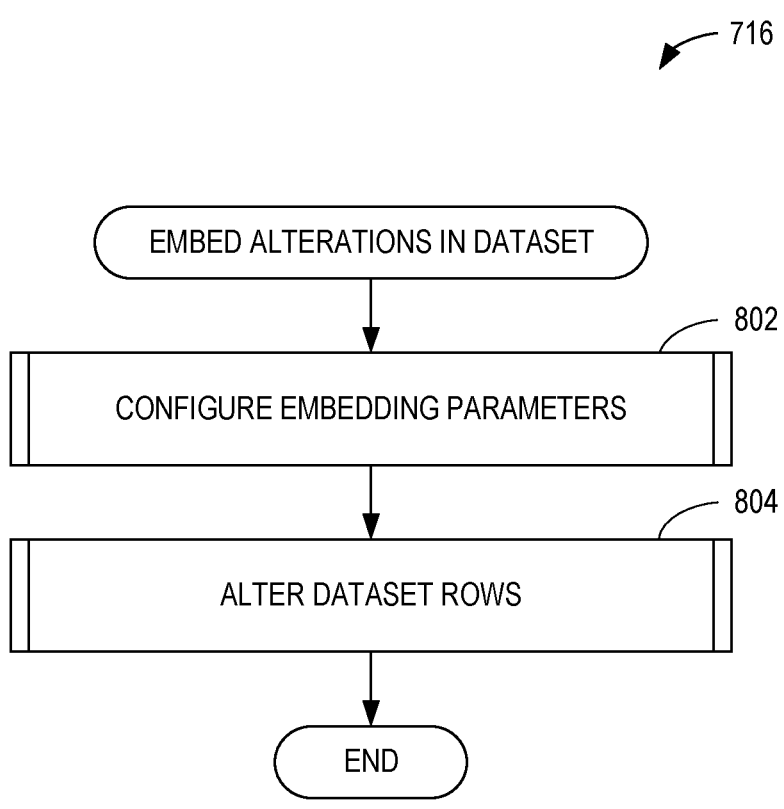

FIG. 8 includes additional detail to embed alterations in the dataset (block 716). In the illustrated example of FIG. 8, the parameter configuration circuitry 208 configures embedding parameters (block 802), and the row modification circuitry 210 alters dataset rows (block 804).

Figure 9:
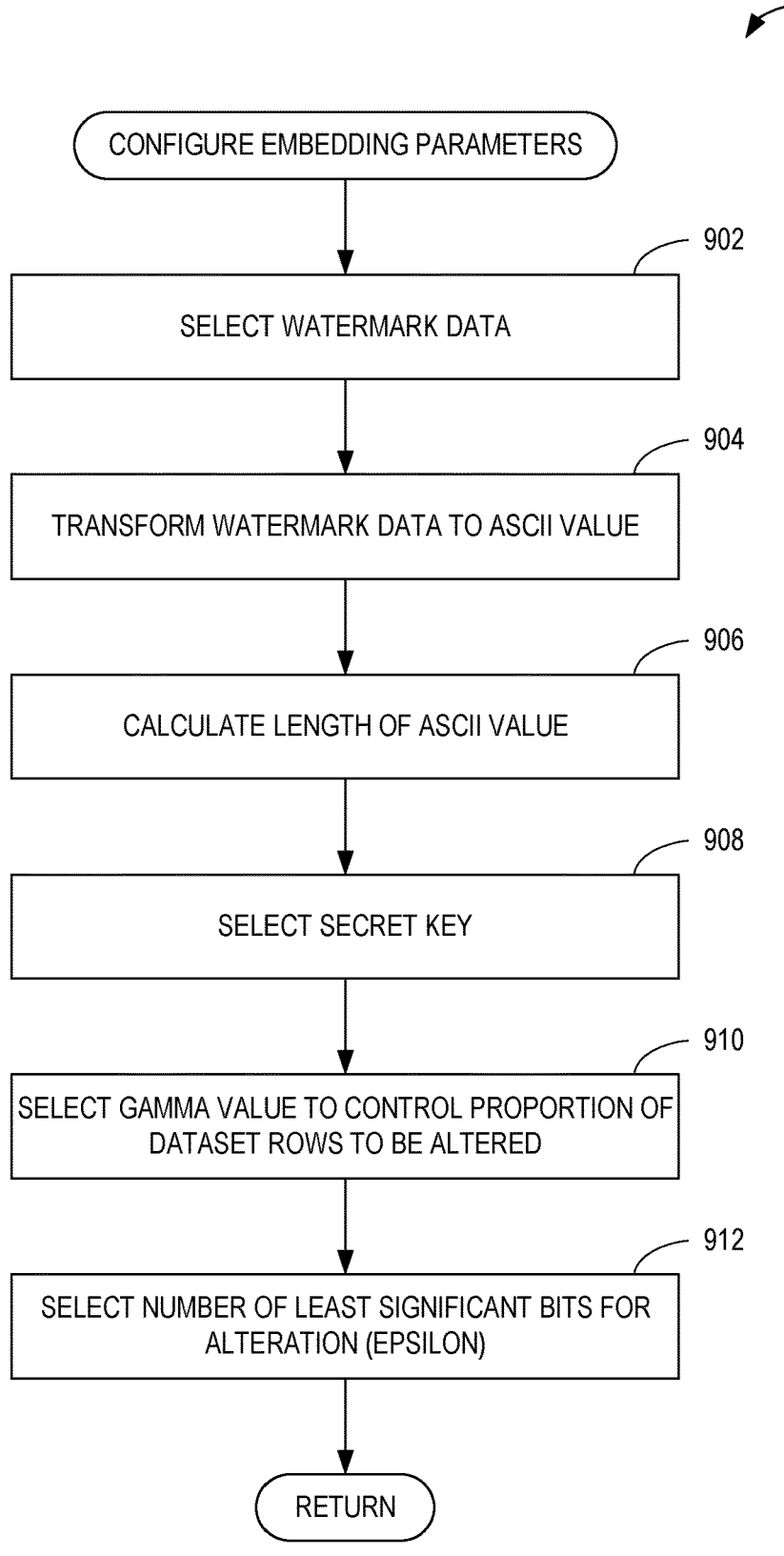

FIG. 9 includes additional detail to configure embedding parameters of block 802. In the illustrated example of FIG. 9, the parameter configuration circuitry 208 selects, receives, retrieves and/or otherwise obtains watermark data (block 902) to be used during alteration of the selected dataset. As described above, the watermark data may be a string of characters, in which the string of characters is associated with a unique entity and/or licensee that is to receive the dataset after it has been altered in a unique manner. The parameter configuration circuitry 208 transforms the watermark data into a numeric representation, such as ASCII (block 904) and calculates a length of the numeric representation (block 906). The parameter configuration circuitry 208 selects, receives, retrieves and/or otherwise obtains a secret key (block 908) to be used during alteration of the selected dataset. Similar to the watermark data, the secret key may be a string of characters, in which the string of characters is associated with the unique entity and/or licensee that is to receive the dataset after it has been altered in a unique manner. The parameter configuration circuitry 208 selects a gamma value to control a proportion of dataset rows that are to be altered (block 910) and selects a number of least significant bits for alteration (block 912) (e.g., corresponding to the previously selected Epsilon parameter). Control then returns to block 804 of FIG. 8.

Figure 10:
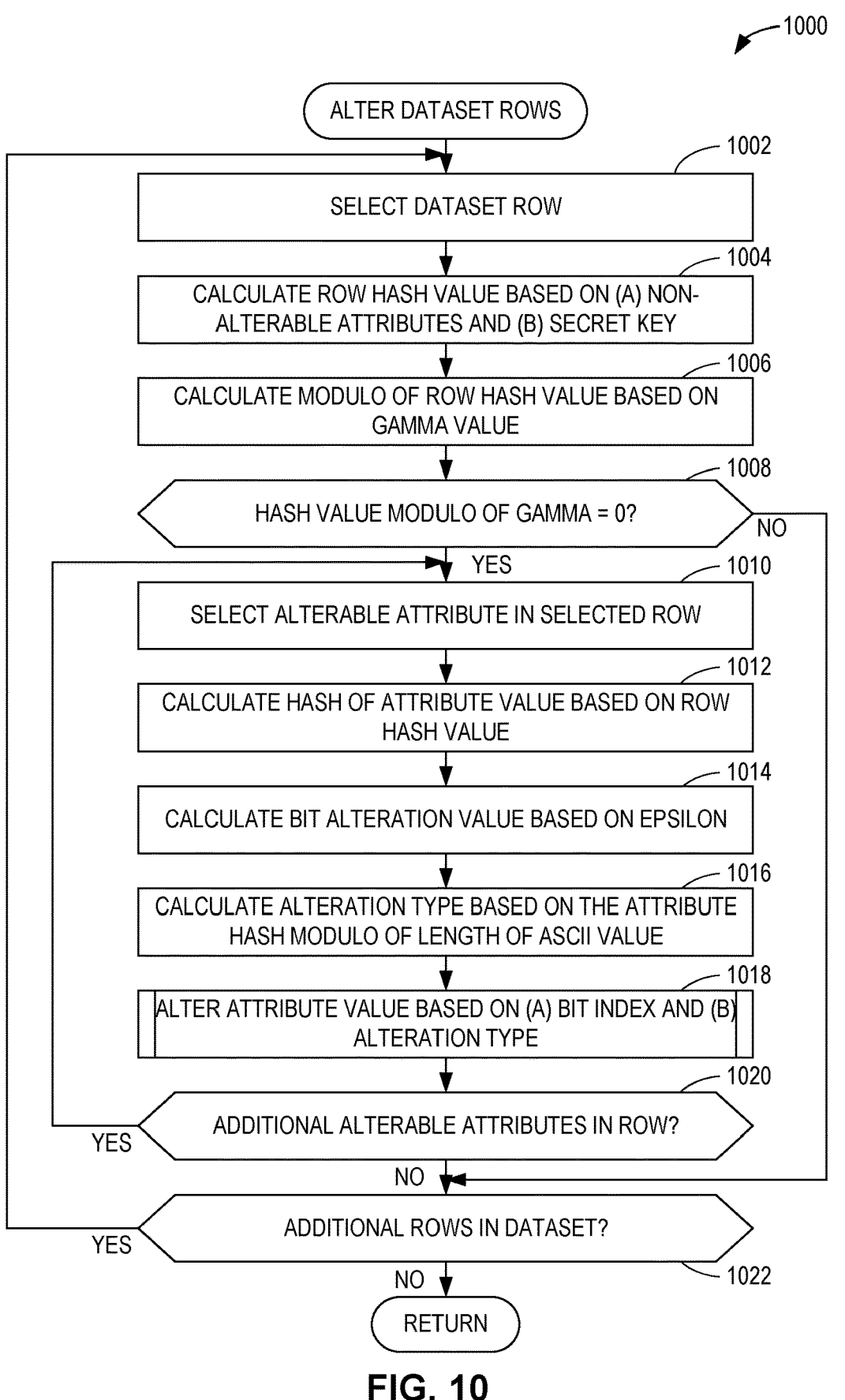

FIG. 10 includes additional detail to alter dataset rows of block 804. In the illustrated example of FIG. 10, the row modification circuitry 210 selects a dataset row (block 1002), such as a first row 636 of the dataset as shown in FIG. 6. The hash circuitry 212 calculates a row hash value based on (a) the attributes that were previously deemed and/or otherwise designated as non-alterable and (b) the secret key (block 1004). As described above, the example row hash value 638 of FIG. 6 is based on a baseline sales unit attribute value, an average number of stores selling attribute value, and a product ID attribute value, all of which were designated as non-alterable attributes in the first row 636. To determine whether the first row 636 should be a row in which attributes are allowed to be altered, the hash circuitry 212 calculates a modulo of the row hash value 638 and the gamma value (block 1006). As described above, for the sake of example gamma is set to a value of "3," but other values are possible. If the result of the modulo operation is zero (0) (block 1008), then the selected row is designated as a row where attribute values are to be modified and a value/designator "TRUE" is assigned in the hash modulo gamma column 622, otherwise a value/designator "FALSE" is assigned. If the hash circuitry 212 determines that the modulo operation is non-zero (block 1008), then control advances to block 1022 in which the example row modification circuitry 210 determines if there are additional rows in the selected dataset to be analyzed.

However, if the result of the modulo operation is zero (0) (block 1008), meaning that the selected row is a candidate for alteration of attributes therein, then the row modification circuitry 210 selects an alterable attribute in the selected row (block 1010) and the hash circuitry 212 calculates a hash based on (a) the header of the selected attribute value and (b) the previously calculated row hash value (block 1012). As described above, if the selected attribute value is the baseline sales value 640, then the resulting attribute hash value 642 in this example is "−162319114." The hash circuitry 212 calculates a bit index value based on Epsilon (block 1014), and calculates an alteration type based on the attribute hash modulo of the length of the ASCII value (block 1016). With these calculated values, the row modification circuitry 210 alters the attribute value based on (a) the bit index and (b) an alteration type (block 1018).

Figure 11:
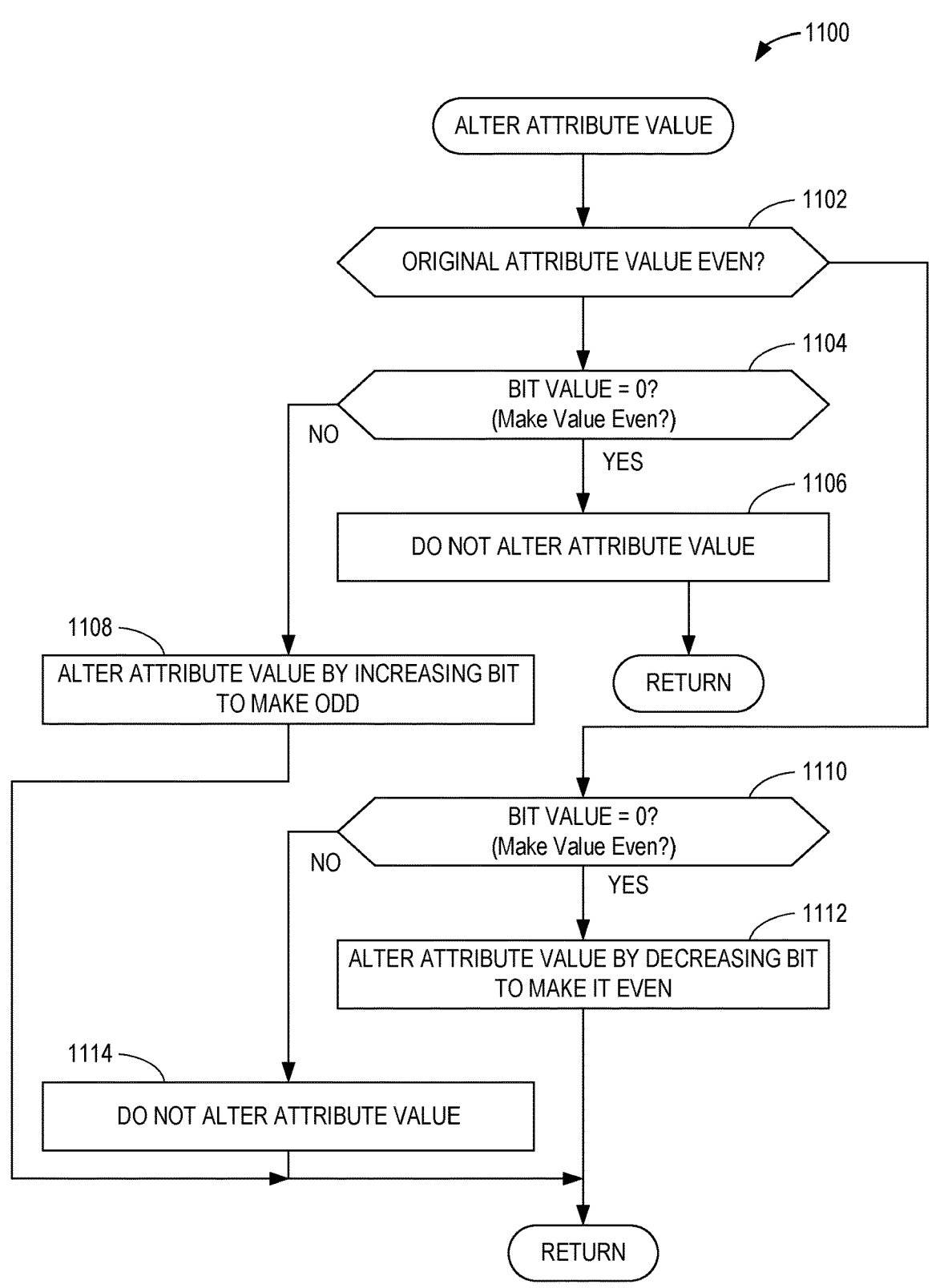

FIG. 11 includes additional detail of block 1018 to alter the attribute value. In the illustrated example of FIG. 11, the row modification circuitry 210 determines whether the original attribute value is even (block 1102). If so, then the row modification circuitry 210 determines wither the bit value is zero (0) (block 1104), which is indicative of an instruction to cause the resulting altered value to be even. If so, then there is no need to alter the attribute value and the row modification circuitry 210 refrains from allowing the fact to be modified (block 1106). On the other hand, if the bit value is non-zero or TRUE (block 1104), then this is indicative of an instruction to cause the resulting altered value to be odd. As such, the row modification circuitry 210 alters the attribute value by increasing the bit to be modified to make the value odd (block 1108).

If the original attribute value is not even (e.g., it is odd) (block 1102), then the row modification circuitry 210 determines if the bit value is zero (0) (block 1110), which is indicative of an instruction to cause the resulting altered value to be even. If the row modification circuitry 210 determines that the bit value is zero (0), then because the original attribute value is odd it is altered by decreasing its value to make it an even number (block 1112). Otherwise, if the row modification circuitry 210 determines that the bit value is one (1), then there is no need to alter the original attribute value (block 1114) because it is already odd.

Figure 12:
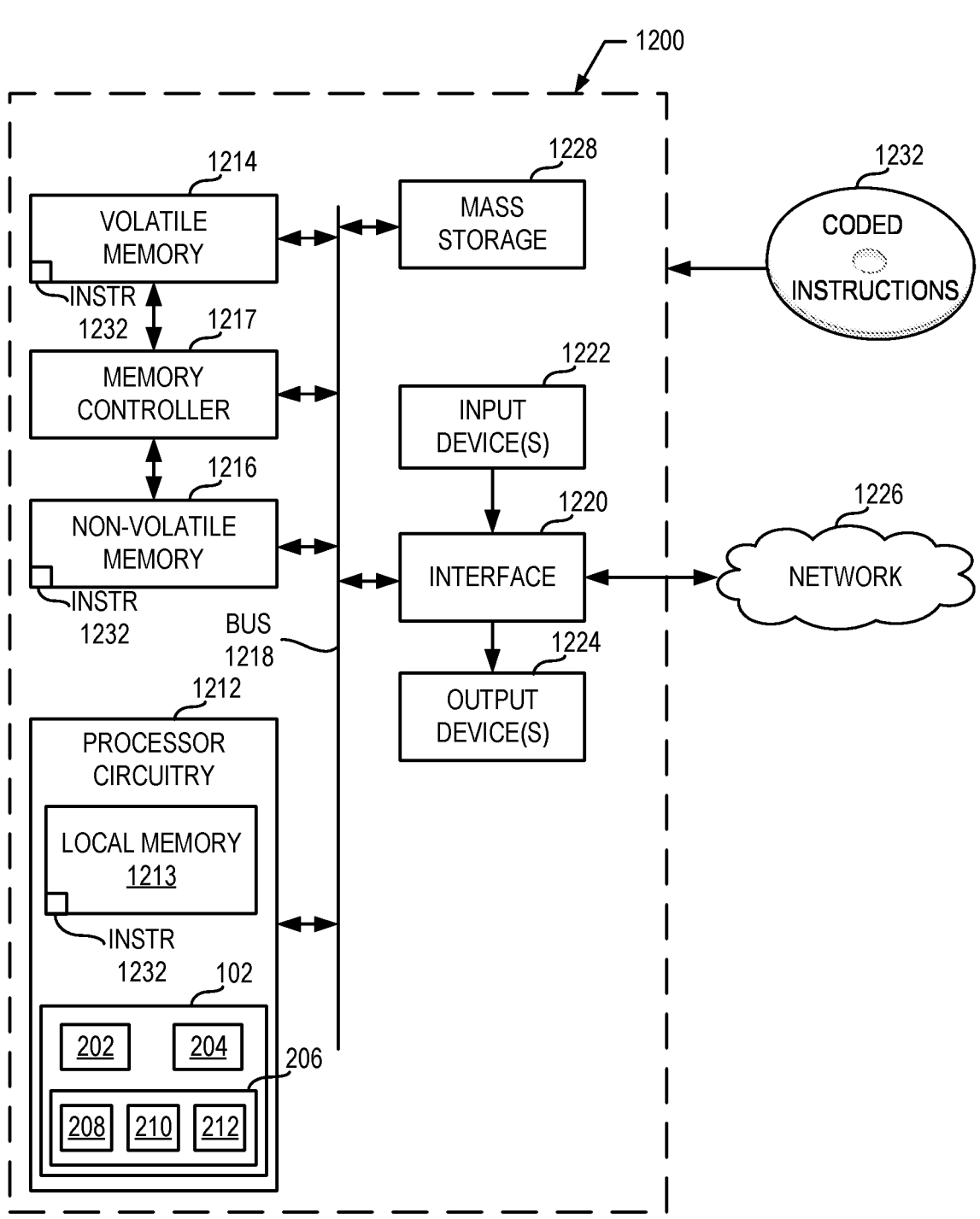
FIG. 12 is a block diagram of an example processing platform including programmable circuitry structured to execute, instantiate, and/or perform the example machine readable instructions and/or perform the example operations of FIGS. 7-11 to implement the dataset security circuitry 102 of FIG. 2.

FIG. 12 is a block diagram of an example programmable circuitry platform 1200 structured to execute and/or instantiate the example machine-readable instructions and/or the example operations of FIGS. 7-11 to implement the dataset security circuitry 102 of FIG. 2. The programmable circuitry platform 1200 can be, for example, a server, a personal computer, a workstation, a self-learning machine (e.g., a neural network), a mobile device (e.g., a cell phone, a smart phone, a tablet such as an iPad™), an Internet appliance, a set top box, a headset (e.g., an augmented reality (AR) headset, a virtual reality (VR) headset, etc.) or other wearable device, or any other type of computing and/or electronic device.

The programmable circuitry platform 1200 of the illustrated example includes programmable circuitry 1212. The programmable circuitry 1212 of the illustrated example is hardware. For example, the programmable circuitry 1212 can be implemented by one or more integrated circuits, logic circuits, FPGAs, microprocessors, CPUs, GPUs, DSPs, and/or microcontrollers from any desired family or manufacturer. The programmable circuitry 1212 may be implemented by one or more semiconductor based (e.g., silicon based) devices. In this example, the programmable circuitry 1212 implements the example dataset interface circuitry 202, the example dataset analysis circuitry 204, the example dataset modification circuitry 206, the example parameter configuration circuitry 208, the example row modification circuitry 210, the example hash circuitry 212, and the example dataset security circuitry 102.

The programmable circuitry 1212 of the illustrated example includes a local memory 1213 (e.g., a cache, registers, etc.). The programmable circuitry 1212 of the illustrated example is in communication with main memory 1214, 1216, which includes a volatile memory 1214 and a non-volatile memory 1216, by a bus 1218. The volatile memory 1214 may be implemented by Synchronous Dynamic Random Access Memory (SDRAM), Dynamic Random Access Memory (DRAM), RAMBUS® Dynamic Random Access Memory (RDRAM®), and/or any other type of RAM device. The non-volatile memory 1216 may be implemented by flash memory and/or any other desired type of memory device. Access to the main memory 1214, 1216 of the illustrated example is controlled by a memory controller 1217. In some examples, the memory controller 1217 may be implemented by one or more integrated circuits, logic circuits, microcontrollers from any desired family or manufacturer, or any other type of circuitry to manage the flow of data going to and from the main memory 1214, 1216.

The programmable circuitry platform 1200 of the illustrated example also includes interface circuitry 1220. The interface circuitry 1220 may be implemented by hardware in accordance with any type of interface standard, such as an Ethernet interface, a universal serial bus (USB) interface, a Bluetooth® interface, a near field communication (NFC) interface, a Peripheral Component Interconnect (PCI) interface, and/or a Peripheral Component Interconnect Express (PCIe) interface.

In the illustrated example, one or more input devices 1222 are connected to the interface circuitry 1220. The input device(s) 1222 permit(s) a user (e.g., a human user, a machine user, etc.) to enter data and/or commands into the programmable circuitry 1212. The input device(s) 1222 can be implemented by, for example, an audio sensor, a microphone, a keyboard, a button, a mouse, a touchscreen, a trackpad, a trackball, an isopoint device, and/or a voice recognition system.

One or more output devices 1224 are also connected to the interface circuitry 1220 of the illustrated example. The output device(s) 1224 can be implemented, for example, by display devices (e.g., a light emitting diode (LED), an organic light emitting diode (OLED), a liquid crystal display (LCD), a cathode ray tube (CRT) display, an in-place switching (IPS) display, a touchscreen, etc.), a tactile output device, a printer, and/or speaker. The interface circuitry 1220 of the illustrated example, thus, typically includes a graphics driver card, a graphics driver chip, and/or graphics processor circuitry such as a GPU.

The interface circuitry 1220 of the illustrated example also includes a communication device such as a transmitter, a receiver, a transceiver, a modem, a residential gateway, a wireless access point, and/or a network interface to facilitate exchange of data with external machines (e.g., computing devices of any kind) by a network 1226. The communication can be by, for example, an Ethernet connection, a digital subscriber line (DSL) connection, a telephone line connection, a coaxial cable system, a satellite system, a beyond-line-of-sight wireless system, a line-of-sight wireless system, a cellular telephone system, an optical connection, etc.

The programmable circuitry platform 1200 of the illustrated example also includes one or more mass storage discs or devices 1228 to store firmware, software, and/or data. Examples of such mass storage discs or devices 1228 include magnetic storage devices (e.g., floppy disk, drives, HDDs, etc.), optical storage devices (e.g., Blu-ray disks, CDs, DVDs, etc.), RAID systems, and/or solid-state storage discs or devices such as flash memory devices and/or SSDs.

The machine readable instructions 1232, which may be implemented by the machine readable instructions of FIGS. 7-11, may be stored in the mass storage device 1228, in the volatile memory 1214, in the non-volatile memory 1216, and/or on at least one non-transitory computer readable storage medium such as a CD or DVD which may be removable.

Figure 13:
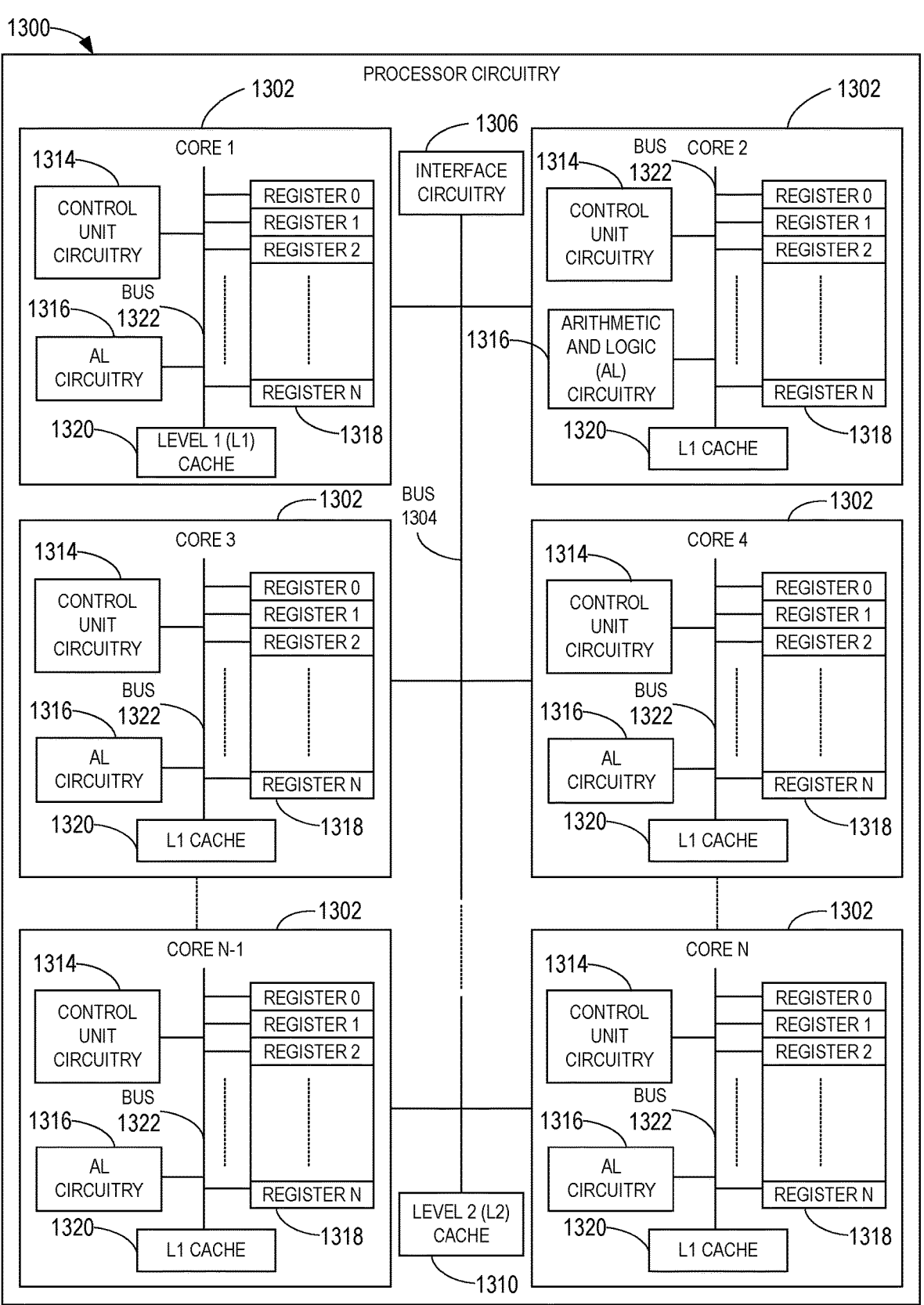
FIG. 13 is a block diagram of an example implementation of the programmable circuitry of FIG. 12.

FIG. 13 is a block diagram of an example implementation of the programmable circuitry 1212 of FIG. 12. In this example, the programmable circuitry 1212 of FIG. 12 is implemented by a microprocessor 1300. For example, the microprocessor 1300 may be a general-purpose microprocessor (e.g., general-purpose microprocessor circuitry). The microprocessor 1300 executes some or all of the machine-readable instructions of the flowcharts of FIGS. 7-11 to effectively instantiate the circuitry of FIG. 2 as logic circuits to perform operations corresponding to those machine readable instructions. In some such examples, the circuitry of FIG. 2 is instantiated by the hardware circuits of the microprocessor 1300 in combination with the machine-readable instructions. For example, the microprocessor 1300 may be implemented by multi-core hardware circuitry such as a CPU, a DSP, a GPU, an XPU, etc. Although it may include any number of example cores 1302 (e.g., 1 core), the microprocessor 1300 of this example is a multi-core semiconductor device including N cores. The cores 1302 of the microprocessor 1300 may operate independently or may cooperate to execute machine readable instructions. For example, machine code corresponding to a firmware program, an embedded software program, or a software program may be executed by one of the cores 1302 or may be executed by multiple ones of the cores 1302 at the same or different times. In some examples, the machine code corresponding to the firmware program, the embedded software program, or the software program is split into threads and executed in parallel by two or more of the cores 1302. The software program may correspond to a portion or all of the machine readable instructions and/or operations represented by the flowcharts of FIGS. 7-11.

The cores 1302 may communicate by a first example bus 1304. In some examples, the first bus 1304 may be implemented by a communication bus to effectuate communication associated with one(s) of the cores 1302. For example, the first bus 1304 may be implemented by at least one of an Inter-Integrated Circuit (I2C) bus, a Serial Peripheral Interface (SPI) bus, a PCI bus, or a PCIe bus. Additionally or alternatively, the first bus 1304 may be implemented by any other type of computing or electrical bus. The cores 1302 may obtain data, instructions, and/or signals from one or more external devices by example interface circuitry 1306. The cores 1302 may output data, instructions, and/or signals to the one or more external devices by the interface circuitry 1306. Although the cores 1302 of this example include example local memory 1320 (e.g., Level 1 (L1) cache that may be split into an L1 data cache and an L1 instruction cache), the microprocessor 1300 also includes example shared memory 1310 that may be shared by the cores (e.g., Level 2 (L2 cache)) for high-speed access to data and/or instructions. Data and/or instructions may be transferred (e.g., shared) by writing to and/or reading from the shared memory 1310. The local memory 1320 of each of the cores 1302 and the shared memory 1310 may be part of a hierarchy of storage devices including multiple levels of cache memory and the main memory (e.g., the main memory 1214, 1216 of FIG. 12). Typically, higher levels of memory in the hierarchy exhibit lower access time and have smaller storage capacity than lower levels of memory. Changes in the various levels of the cache hierarchy are managed (e.g., coordinated) by a cache coherency policy.

Each core 1302 may be referred to as a CPU, DSP, GPU, etc., or any other type of hardware circuitry. Each core 1302 includes control unit circuitry 1314, arithmetic and logic (AL) circuitry (sometimes referred to as an ALU) 1316, a plurality of registers 1318, the local memory 1320, and a second example bus 1322. Other structures may be present. For example, each core 1302 may include vector unit circuitry, single instruction multiple data (SIMD) unit circuitry, load/store unit (LSU) circuitry, branch/jump unit circuitry, floating-point unit (FPU) circuitry, etc. The control unit circuitry 1314 includes semiconductor-based circuits structured to control (e.g., coordinate) data movement within the corresponding core 1302. The AL circuitry 1316 includes semiconductor-based circuits structured to perform one or more mathematic and/or logic operations on the data within the corresponding core 1302. The AL circuitry 1316 of some examples performs integer based operations. In other examples, the AL circuitry 1316 also performs floating-point operations. In yet other examples, the AL circuitry 1316 may include first AL circuitry that performs integer-based operations and second AL circuitry that performs floating-point operations. In some examples, the AL circuitry 1316 may be referred to as an Arithmetic Logic Unit (ALU).

The registers 1318 are semiconductor-based structures to store data and/or instructions such as results of one or more of the operations performed by the AL circuitry 1316 of the corresponding core 1302. For example, the registers 1318 may include vector register(s), SIMD register(s), general-purpose register(s), flag register(s), segment register(s), machine-specific register(s), instruction pointer register(s), control register(s), debug register(s), memory management register(s), machine check register(s), etc. The registers 1318 may be arranged in a bank as shown in FIG. 13. Alternatively, the registers 1318 may be organized in any other arrangement, format, or structure, such as by being distributed throughout the core 1302 to shorten access time. The second bus 1322 may be implemented by at least one of an I2C bus, a SPI bus, a PCI bus, or a PCIe bus.

Each core 1302 and/or, more generally, the microprocessor 1300 may include additional and/or alternate structures to those shown and described above. For example, one or more clock circuits, one or more power supplies, one or more power gates, one or more cache home agents (CHAs), one or more converged/common mesh stops (CMSs), one or more shifters (e.g., barrel shifter(s)) and/or other circuitry may be present. The microprocessor 1300 is a semiconductor device fabricated to include many transistors interconnected to implement the structures described above in one or more integrated circuits (ICs) contained in one or more packages.

The microprocessor 1300 may include and/or cooperate with one or more accelerators (e.g., acceleration circuitry, hardware accelerators, etc.). In some examples, accelerators are implemented by logic circuitry to perform certain tasks more quickly and/or efficiently than can be done by a general-purpose processor. Examples of accelerators include ASICs and FPGAs such as those discussed herein. A GPU, DSP and/or other programmable device can also be an accelerator. Accelerators may be on-board the microprocessor 1300, in the same chip package as the microprocessor 1300 and/or in one or more separate packages from the microprocessor 1300.

Figure 14:
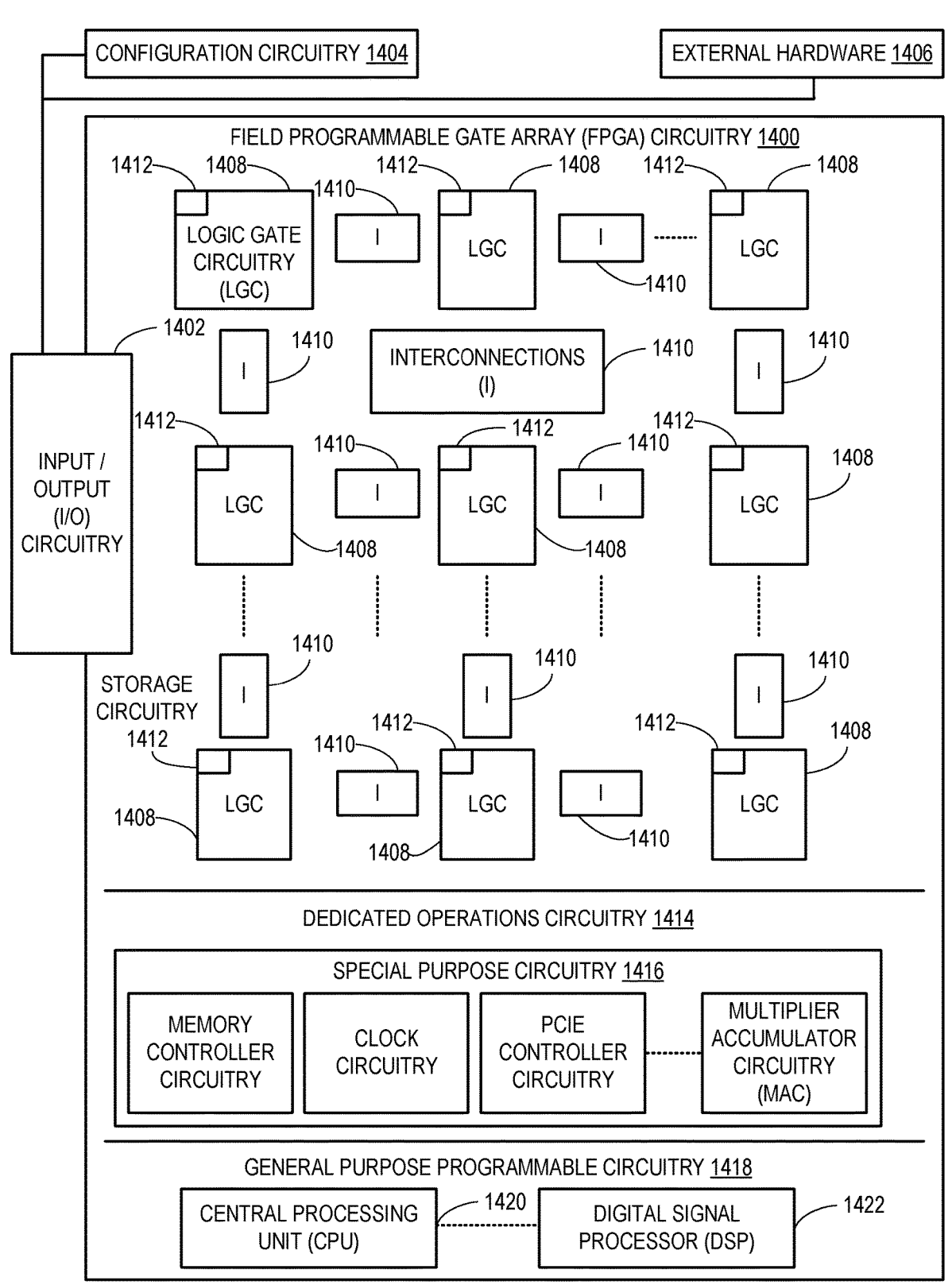
FIG. 14 is a block diagram of another example implementation of the programmable circuitry of FIG. 12.

FIG. 14 is a block diagram of another example implementation of the programmable circuitry 1212 of FIG. 12. In this example, the programmable circuitry 1212 is implemented by FPGA circuitry 1400. For example, the FPGA circuitry 1400 may be implemented by an FPGA. The FPGA circuitry 1400 can be used, for example, to perform operations that could otherwise be performed by the example microprocessor 1300 of FIG. 13 executing corresponding machine readable instructions. However, once configured, the FPGA circuitry 1400 instantiates the operations and/or functions corresponding to the machine readable instructions in hardware and, thus, can often execute the operations/functions faster than they could be performed by a general-purpose microprocessor executing the corresponding software.

More specifically, in contrast to the microprocessor 1300 of FIG. 13 described above (which is a general purpose device that may be programmed to execute some or all of the machine readable instructions represented by the flowchart(s) of FIGS. 7-11 but whose interconnections and logic circuitry are fixed once fabricated), the FPGA circuitry 1400 of the example of FIG. 14 includes interconnections and logic circuitry that may be configured, structured, programmed, and/or interconnected in different ways after fabrication to instantiate, for example, some or all of the operations/functions corresponding to the machine readable instructions represented by the flowchart(s) of FIGS. 7-11. In particular, the FPGA circuitry 1400 may be thought of as an array of logic gates, interconnections, and switches. The switches can be programmed to change how the logic gates are interconnected by the interconnections, effectively forming one or more dedicated logic circuits (unless and until the FPGA circuitry 1400 is reprogrammed). The configured logic circuits enable the logic gates to cooperate in different ways to perform different operations on data received by input circuitry. Those operations may correspond to some or all of the instructions (e.g., the software and/or firmware) represented by the flowchart(s) of FIGS. 7-11. As such, the FPGA circuitry 1400 may be configured and/or structured to effectively instantiate some or all of the operations/functions corresponding to the machine readable instructions of the flowchart(s) of FIGS. 7-11 as dedicated logic circuits to perform the operations/functions corresponding to those software instructions in a dedicated manner analogous to an ASIC. Therefore, the FPGA circuitry 1400 may perform the operations/functions corresponding to the some or all of the machine readable instructions of FIGS. 7-11 faster than the general-purpose microprocessor can execute the same.

In the example of FIG. 14, the FPGA circuitry 1400 is configured and/or structured in response to being programmed (and/or reprogrammed one or more times) based on a binary file. In some examples, the binary file may be compiled and/or generated based on instructions in a hardware description language (HDL) such as Lucid, Very High Speed Integrated Circuits (VHSIC) Hardware Description Language (VHDL), or Verilog. For example, a user (e.g., a human user, a machine user, etc.) may write code or a program corresponding to one or more operations/functions in an HDL; the code/program may be translated into a low-level language as needed; and the code/program (e.g., the code/program in the low-level language) may be converted (e.g., by a compiler, a software application, etc.) into the binary file. In some examples, the FPGA circuitry 1400 of FIG. 14 may access and/or load the binary file to cause the FPGA circuitry 1400 of FIG. 14 to be configured and/or structured to perform the one or more operations/functions. For example, the binary file may be implemented by a bit stream (e.g., one or more computer-readable bits, one or more machine-readable bits, etc.), data (e.g., computer-readable data, machine-readable data, etc.), and/or machine-readable instructions accessible to the FPGA circuitry 1400 of FIG. 14 to cause configuration and/or structuring of the FPGA circuitry 1400 of FIG. 14, or portion(s) thereof.

In some examples, the binary file is compiled, generated, transformed, and/or otherwise output from a uniform software platform utilized to program FPGAs. For example, the uniform software platform may translate first instructions (e.g., code or a program) that correspond to one or more operations/functions in a high-level language (e.g., C, C++, Python, etc.) into second instructions that correspond to the one or more operations/functions in an HDL. In some such examples, the binary file is compiled, generated, and/or otherwise output from the uniform software platform based on the second instructions. In some examples, the FPGA circuitry 1400 of FIG. 14 may access and/or load the binary file to cause the FPGA circuitry 1400 of FIG. 14 to be configured and/or structured to perform the one or more operations/functions. For example, the binary file may be implemented by a bit stream (e.g., one or more computer-readable bits, one or more machine-readable bits, etc.), data (e.g., computer-readable data, machine-readable data, etc.), and/or machine-readable instructions accessible to the FPGA circuitry 1400 of FIG. 14 to cause configuration and/or structuring of the FPGA circuitry 1400 of FIG. 14, or portion(s) thereof.

The FPGA circuitry 1400 of FIG. 14, includes example input/output (I/O) circuitry 1402 to obtain and/or output data to/from example configuration circuitry 1404 and/or external hardware 1406. For example, the configuration circuitry 1404 may be implemented by interface circuitry that may obtain a binary file, which may be implemented by a bit stream, data, and/or machine-readable instructions, to configure the FPGA circuitry 1400, or portion(s) thereof. In some such examples, the configuration circuitry 1404 may obtain the binary file from a user, a machine (e.g., hardware circuitry (e.g., programmable or dedicated circuitry) that may implement an Artificial Intelligence/Machine Learning (AI/ML) model to generate the binary file), etc., and/or any combination(s) thereof). In some examples, the external hardware 1406 may be implemented by external hardware circuitry. For example, the external hardware 1406 may be implemented by the microprocessor 1300 of FIG. 13.

The FPGA circuitry 1400 also includes an array of example logic gate circuitry 1408, a plurality of example configurable interconnections 1410, and example storage circuitry 1412. The logic gate circuitry 1408 and the configurable interconnections 1410 are configurable to instantiate one or more operations/functions that may correspond to at least some of the machine readable instructions of FIGS. 7-11 and/or other desired operations. The logic gate circuitry 1408 shown in FIG. 14 is fabricated in blocks or groups. Each block includes semiconductor-based electrical structures that may be configured into logic circuits. In some examples, the electrical structures include logic gates (e.g., And gates, Or gates, Nor gates, etc.) that provide basic building blocks for logic circuits. Electrically controllable switches (e.g., transistors) are present within each of the logic gate circuitry 1408 to enable configuration of the electrical structures and/or the logic gates to form circuits to perform desired operations/functions. The logic gate circuitry 1408 may include other electrical structures such as look-up tables (LUTs), registers (e.g., flip-flops or latches), multiplexers, etc.

The configurable interconnections 1410 of the illustrated example are conductive pathways, traces, vias, or the like that may include electrically controllable switches (e.g., transistors) whose state can be changed by programming (e.g., using an HDL instruction language) to activate or deactivate one or more connections between one or more of the logic gate circuitry 1408 to program desired logic circuits.

The storage circuitry 1412 of the illustrated example is structured to store result(s) of the one or more of the operations performed by corresponding logic gates. The storage circuitry 1412 may be implemented by registers or the like. In the illustrated example, the storage circuitry 1412 is distributed amongst the logic gate circuitry 1408 to facilitate access and increase execution speed.

The example FPGA circuitry 1400 of FIG. 14 also includes example dedicated operations circuitry 1414. In this example, the dedicated operations circuitry 1414 includes special purpose circuitry 1416 that may be invoked to implement commonly used functions to avoid the need to program those functions in the field. Examples of such special purpose circuitry 1416 include memory (e.g., DRAM) controller circuitry, PCIe controller circuitry, clock circuitry, transceiver circuitry, memory, and multiplier-accumulator circuitry. Other types of special purpose circuitry may be present. In some examples, the FPGA circuitry 1400 may also include example general purpose programmable circuitry 1418 such as an example CPU 1420 and/or an example DSP 1422. Other general purpose programmable circuitry 1418 may additionally or alternatively be present such as a GPU, an XPU, etc., that can be programmed to perform other operations.

Although FIGS. 13 and 14 illustrate two example implementations of the programmable circuitry 1212 of FIG. 12, many other approaches are contemplated. For example, FPGA circuitry may include an on-board CPU, such as one or more of the example CPU 1420 of FIG. 13. Therefore, the programmable circuitry 1212 of FIG. 12 may additionally be implemented by combining at least the example micropro- cessor 1300 of FIG. 13 and the example FPGA circuitry 1400 of FIG. 14. In some such hybrid examples, one or more cores 1302 of FIG. 13 may execute a first portion of the machine readable instructions represented by the flowchart(s) of FIGS. 7-11 to perform first operation(s)/ function(s), the FPGA circuitry 1400 of FIG. 14 may be configured and/or structured to perform second operation(s)/function(s) corresponding to a second portion of the machine readable instructions represented by the flowcharts of FIGS. 7-11, and/or an ASIC may be configured and/or structured to perform third operation(s)/function(s) corresponding to a third portion of the machine readable instructions represented by the flowcharts of FIGS. 7-11.

It should be understood that some or all of the circuitry of FIG. 2 may, thus, be instantiated at the same or different times. For example, same and/or different portion(s) of the microprocessor 1300 of FIG. 13 may be programmed to execute portion(s) of machine-readable instructions at the same and/or different times. In some examples, same and/or different portion(s) of the FPGA circuitry 1400 of FIG. 14 may be configured and/or structured to perform operations/ functions corresponding to portion(s) of machine-readable instructions at the same and/or different times.

In some examples, some or all of the circuitry of FIG. 2 may be instantiated, for example, in one or more threads executing concurrently and/or in series. For example, the microprocessor 1300 of FIG. 13 may execute machine readable instructions in one or more threads executing concurrently and/or in series. In some examples, the FPGA circuitry 1400 of FIG. 14 may be configured and/or struc- tured to carry out operations/functions concurrently and/or in series. Moreover, in some examples, some or all of the circuitry of FIG. 2 may be implemented within one or more virtual machines and/or containers executing on the micro- processor 1300 of FIG. 13.

In some examples, the programmable circuitry 1212 of FIG. 12 may be in one or more packages. For example, the microprocessor 1300 of FIG. 13 and/or the FPGA circuitry 1400 of FIG. 14 may be in one or more packages. In some examples, an XPU may be implemented by the program- mable circuitry 1212 of FIG. 12, which may be in one or more packages. For example, the XPU may include a CPU (e.g., the microprocessor 1300 of FIG. 13, the CPU 1420 of FIG. 14, etc.) in one package, a DSP (e.g., the DSP 1422 of FIG. 14) in another package, a GPU in yet another package, and an FPGA (e.g., the FPGA circuitry 1400 of FIG. 14) in still yet another package.

Figure 15:
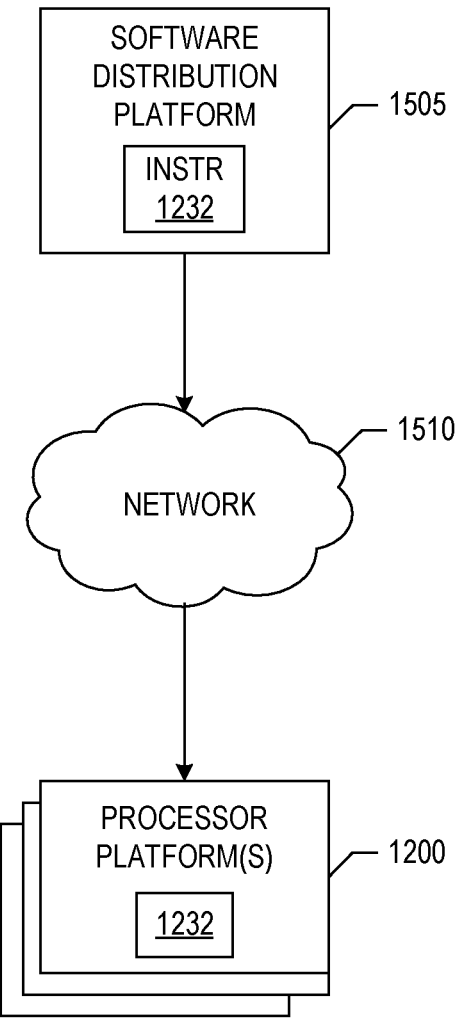
FIG. 15 is a block diagram of an example software/firmware/instructions distribution platform (e.g., one or more servers) to distribute software, instructions, and/or firmware (e.g., corresponding to the example machine readable instructions of FIGS. 7-11) to client devices associated with end users and/or consumers (e.g., for license, sale, and/or use), retailers (e.g., for sale, re-sale, license, and/or sub-license), and/or original equipment manufacturers (OEMs) (e.g., for inclusion in products to be distributed to, for example, retailers and/or to other end users such as direct buy customers).

A block diagram illustrating an example software distri- bution platform 1505 to distribute software such as the example machine readable instructions 1232 of FIG. 12 to other hardware devices (e.g., hardware devices owned and/ or operated by third parties from the owner and/or operator of the software distribution platform) is illustrated in FIG. 15. The example software distribution platform 1505 may be implemented by any computer server, data facility, cloud service, etc., capable of storing and transmitting software to other computing devices. The third parties may be customers of the entity owning and/or operating the software distribu- tion platform 1505. For example, the entity that owns and/or operates the software distribution platform 1505 may be a developer, a seller, and/or a licensor of software such as the example machine readable instructions 1232 of FIG. 12. The third parties may be consumers, users, retailers, OEMs, etc., who purchase and/or license the software for use and/or re-sale and/or sub-licensing. In the illustrated example, the software distribution platform 1505 includes one or more servers and one or more storage devices. The storage devices store the machine readable instructions 1232, which may correspond to the example machine readable instructions of FIGS. 7-11, as described above. The one or more servers of the example software distribution platform 1505 are in communication with an example network 1510, which may correspond to any one or more of the Internet and/or any of the example networks described above. In some examples, the one or more servers are responsive to requests to transmit the software to a requesting party as part of a commercial transaction. Payment for the delivery, sale, and/or license of the software may be handled by the one or more servers of the software distribution platform and/or by a third party payment entity. The servers enable purchasers and/or licen- sors to download the machine readable instructions 1232 from the software distribution platform 1505. For example, the software, which may correspond to the example machine readable instructions of FIG. 7-11, may be downloaded to the example programmable circuitry platform 1200, which is to execute the machine readable instructions 1232 to implement the dataset security circuitry 102. In some examples, one or more servers of the software distribution platform 1505 periodically offer, transmit, and/or force updates to the software (e.g., the example machine readable instructions 1232 of FIG. 12) to ensure improvements, patches, updates, etc., are distributed and applied to the software at the end user devices. Although referred to as software above, the distributed "software" could alterna- tively be firmware.

"Including" and "comprising" (and all forms and tenses thereof) are used herein to be open ended terms. Thus, whenever a claim employs any form of "include" or "com- prise" (e.g., comprises, includes, comprising, including, having, etc.) as a preamble or within a claim recitation of any kind, it is to be understood that additional elements, terms, etc., may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, or (7) A with B and with C. As used herein in the context of describing structures, components, items, objects and/or things, the phrase "at least one of A and B" is intended to refer to implementations including any of (1) at least one A, (2) at least one B, or (3) at least one A and at least one B. Similarly, as used herein in the context of describing structures, components, items, objects and/or things, the phrase "at least one of A or B" is intended to refer to implementations including any of (1) at least one A, (2) at least one B, or (3) at least one A and at least one B. As used herein in the context of describing the performance or execution of pro- cesses, instructions, actions, activities, etc., the phrase "at least one of A and B" is intended to refer to implementations including any of (1) at least one A, (2) at least one B, or (3) at least one A and at least one B. Similarly, as used herein in the context of describing the performance or execution of processes, instructions, actions, activities, etc., the phrase "at least one of A or B" is intended to refer to implementations including any of (1) at least one A, (2) at least one B, or (3) at least one A and at least one B.

As used herein, singular references (e.g., "a", "an", "first", "second", etc.) do not exclude a plurality. The term "a" or "an" object, as used herein, refers to one or more of that object. The terms "a" (or "an"), "one or more", and "at least one" are used interchangeably herein. Furthermore, although individually listed, a plurality of means, elements, or actions may be implemented by, e.g., the same entity or object. Additionally, although individual features may be included in different examples or claims, these may possibly be combined, and the inclusion in different examples or claims does not imply that a combination of features is not feasible and/or advantageous.

As used herein, unless otherwise stated, the term "above" describes the relationship of two parts relative to Earth. A first part is above a second part, if the second part has at least one part between Earth and the first part. Likewise, as used herein, a first part is "below" a second part when the first part is closer to the Earth than the second part. As noted above, a first part can be above or below a second part with one or more of: other parts therebetween, without other parts therebetween, with the first and second parts touching, or without the first and second parts being in direct contact with one another.

As used in this patent, stating that any part (e.g., a layer, film, area, region, or plate) is in any way on (e.g., positioned on, located on, disposed on, or formed on, etc.) another part, indicates that the referenced part is either in contact with the other part, or that the referenced part is above the other part with one or more intermediate part(s) located therebetween.

As used herein, connection references (e.g., attached, coupled, connected, and joined) may include intermediate members between the elements referenced by the connection reference and/or relative movement between those elements unless otherwise indicated. As such, connection references do not necessarily infer that two elements are directly connected and/or in fixed relation to each other. As used herein, stating that any part is in "contact" with another part is defined to mean that there is no intermediate part between the two parts.

Unless specifically stated otherwise, descriptors such as "first," "second," "third," etc., are used herein without imputing or otherwise indicating any meaning of priority, physical order, arrangement in a list, and/or ordering in any way, but are merely used as labels and/or arbitrary names to distinguish elements for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for identifying those elements distinctly within the context of the discussion (e.g., within a claim) in which the elements might, for example, otherwise share a same name.

As used herein, "approximately" and "about" modify their subjects/values to recognize the potential presence of variations that occur in real world applications. For example, "approximately" and "about" may modify dimensions that may not be exact due to manufacturing tolerances and/or other real world imperfections as will be understood by persons of ordinary skill in the art. For example, "approximately" and "about" may indicate such dimensions may be within a tolerance range of +/−10% unless otherwise specified herein.

As used herein "substantially real time" refers to occurrence in a near instantaneous manner recognizing there may be real world delays for computing time, transmission, etc. Thus, unless otherwise specified, "substantially real time" refers to real time+/−1 second.

As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

As used herein, "programmable circuitry" is defined to include (i) one or more special purpose electrical circuits (e.g., an application specific circuit (ASIC)) structured to perform specific operation(s) and including one or more semiconductor-based logic devices (e.g., electrical hardware implemented by one or more transistors), and/or (ii) one or more general purpose semiconductor-based electrical circuits programmable with instructions to perform specific functions(s) and/or operation(s) and including one or more semiconductor-based logic devices (e.g., electrical hardware implemented by one or more transistors). Examples of programmable circuitry include programmable microprocessors such as Central Processor Units (CPUs) that may execute first instructions to perform one or more operations and/or functions, Field Programmable Gate Arrays (FPGAs) that may be programmed with second instructions to cause configuration and/or structuring of the FPGAs to instantiate one or more operations and/or functions corresponding to the first instructions, Graphics Processor Units (GPUs) that may execute first instructions to perform one or more operations and/or functions, Digital Signal Processors (DSPs) that may execute first instructions to perform one or more operations and/or functions, XPUs, Network Processing Units (NPUs) one or more microcontrollers that may execute first instructions to perform one or more operations and/or functions and/or integrated circuits such as Application Specific Integrated Circuits (ASICs). For example, an XPU may be implemented by a heterogeneous computing system including multiple types of programmable circuitry (e.g., one or more FPGAs, one or more CPUs, one or more GPUs, one or more NPUs, one or more DSPs, etc., and/or any combination(s) thereof), and orchestration technology (e.g., application programming interface(s) (API(s)) that may assign computing task(s) to whichever one(s) of the multiple types of programmable circuitry is/are suited and available to perform the computing task(s).

As used herein integrated circuit/circuitry is defined as one or more semiconductor packages containing one or more circuit elements such as transistors, capacitors, inductors, resistors, current paths, diodes, etc. For example an integrated circuit may be implemented as one or more of an ASIC, an FPGA, a chip, a microchip, programmable circuitry, a semiconductor substrate coupling multiple circuit elements, a system on chip (SoC), etc.

From the foregoing, it will be appreciated that example systems, apparatus, articles of manufacture, and methods have been disclosed that enable protective measures to be applied to datasets before they are released to third parties and a manner of detecting such protected datasets when discovered in the field. Examples disclosed herein support an ability to offer datasets to would-be purchasers in a cleartext format. Particular modifications to the dataset protect it by embedding information unique to the seller, licensor, the original purchaser and/or recipient that is under an obligation (e.g., contractual) to refrain from re-distribution. Accordingly, examples disclosed herein enable identification of one or more parties that have conducted the unauthorized redistribution of the dataset.

Example methods, apparatus, systems, and articles of manufacture to protect datasets are disclosed herein. Further examples and combinations thereof include the following:

Example 1 includes an apparatus comprising interface circuitry, machine-readable instructions, and at least one processor circuit to be programmed by the machine-readable instructions to transform a watermark string to a numeric representation, the numeric representation including position values, determine a row hash value of a dataset satisfies a threshold, the row hash value based on a key value and at least one non-alterable attribute of the dataset, and determine an alteration setting for an alterable attribute based on one of the position values, the one of the position values based on a modulo of (a) an attribute hash value associated with the alterable attribute and (b) a length value of the numeric representation.

Example 2 includes the apparatus as defined in example 1, wherein one or more of the at least one processor circuit is to transform the watermark string to an ASCII representation.

Example 3 includes the apparatus as defined in example 1, wherein one or more of the at least one processor circuit is to determine the at least one non-alterable attribute based on one of an integer type or a floating-point type of a candidate attribute in the dataset.

Example 4 includes the apparatus as defined in example 3, wherein one or more of the at least one processor circuit is to compare the integer type of the candidate attribute to a sensitivity threshold.

Example 5 includes the apparatus as defined in example 4, wherein one or more of the at least one processor circuit is to designate the candidate attribute as a non-alterable attribute when the sensitivity threshold is not satisfied, and designate the candidate attribute as an alterable attribute when the sensitivity threshold is satisfied.

Example 6 includes the apparatus as defined in example 4, wherein the sensitivity threshold is at least one of a mean value or a median value of a plurality of attributes of the dataset.

Example 7 includes the apparatus as defined in example 1, wherein one or more of the at least one processor circuit is to calculate the attribute hash value based on (a) header information associated with the alterable attribute and (b) the row hash value.

Example 8 includes the apparatus as defined in example 1, wherein one or more of the at least one processor circuit is to cause the alteration setting as one of an odd value of the alterable attribute or an even value of the alterable attribute based on a value of the one of the position values.

Example 9 includes the apparatus as defined in example 8, wherein one or more of the at least one processor circuit is to alter the alterable attribute as an even value when the alteration setting is even.

Example 10 includes the apparatus as defined in example 8, wherein one or more of the at least one processor circuit is to alter the alterable attribute as an odd value when the alteration setting is odd.

Example 11 includes at least one non-transitory machine-readable medium comprising machine-readable instructions to cause at least one processor circuit to at least transform a watermark string to a numeric representation, the numeric representation including position values, determine a row hash value of a dataset satisfies a threshold, the row hash value based on a key value and at least one non-alterable attribute of the dataset, and determine an alteration setting for an alterable attribute based on one of the position values, the one of the position values based on a modulo of (a) an attribute hash value associated with the alterable attribute and (b) a length value of the numeric representation.

Example 12 includes the at least one non-transitory machine-readable medium of example 11, wherein the machine-readable instructions are to cause one or more of the at least one processor circuit to transform the watermark string to an ASCII representation.

Example 13 includes the at least one non-transitory machine-readable medium of example 11, wherein the machine-readable instructions are to cause one or more of the at least one processor circuit to determine the at least one non-alterable attribute based on one of an integer type or a floating-point type of a candidate attribute in the dataset.

Example 14 includes the at least one non-transitory machine-readable medium of example 13, wherein the machine-readable instructions are to cause one or more of the at least one processor circuit to compare the integer type of the candidate attribute to a sensitivity threshold.

Example 15 includes the at least one non-transitory machine-readable medium of example 14, wherein the machine-readable instructions are to cause one or more of the at least one processor circuit to designate the candidate attribute as a non-alterable attribute when the sensitivity threshold is not satisfied, and designate the candidate attribute as an alterable attribute when the sensitivity threshold is satisfied.

Example 16 includes the at least one non-transitory machine-readable medium of example 14, wherein the machine-readable instructions are to cause one or more of the at least one processor circuit to determine the sensitivity threshold is at least one of a mean value or a median value of a plurality of attributes of the dataset.

Example 17 includes the at least one non-transitory machine-readable medium of example 11, wherein the machine-readable instructions are to cause one or more of the at least one processor circuit to calculate the attribute hash value based on (a) header information associated with the alterable attribute and (b) the row hash value.

Example 18 includes the at least one non-transitory machine-readable medium of example 11, wherein the machine-readable instructions are to cause one or more of the at least one processor circuit to cause the alteration setting as one of an odd value of the alterable attribute or an even value of the alterable attribute based on a value of the one of the position values.

Example 19 includes the at least one non-transitory machine-readable medium of example 18, wherein the machine-readable instructions are to cause one or more of the at least one processor circuit to alter the alterable attribute as an even value when the alteration setting is even.

Example 20 includes the at least one non-transitory machine-readable medium of example 18, wherein the machine-readable instructions are to cause one or more of the at least one processor circuit to alter the alterable attribute as an odd value when the alteration setting is odd.

Example 21 includes a method comprising transforming a watermark string to a numeric representation, the numeric representation including position values, determining, by at least one processor circuit programmed by at least one instruction, a row hash value of a dataset satisfies a threshold, the row hash value based on a key value and at least one non-alterable attribute of the dataset, and determining, by one or more of the at least one processor circuit, an alteration setting for an alterable attribute based on one of the position values, the one of the position values based on a modulo of (a) an attribute hash value associated with the alterable attribute and (b) a length value of the numeric representation.

Example 22 includes the method as defined in example 21, further including transforming the watermark string to an ASCII representation.

Example 23 includes the method as defined in example 21, further including determining the at least one non-alterable attribute based on one of an integer type or a floating-point type of a candidate attribute in the dataset.

Example 24 includes the method as defined in example 23, further including comparing the integer type of the candidate attribute to a sensitivity threshold.

Example 25 includes the method as defined in example 24, further including designating the candidate attribute as a non-alterable attribute when the sensitivity threshold is not satisfied, and designating the candidate attribute as an alterable attribute when the sensitivity threshold is satisfied.

Example 26 includes the method as defined in example 24, wherein the sensitivity threshold is at least one of a mean value or a median value of a plurality of attributes of the dataset.

Example 27 includes the method as defined in example 21, further including calculating the attribute hash value based on (a) header information associated with the alterable attribute and (b) the row hash value.

Example 28 includes the method as defined in example 21, further including causing the alteration setting as one of an odd value of the alterable attribute or an even value of the alterable attribute based on a value of the one of the position values.

Example 29 includes the method as defined in example 28, further including altering the alterable attribute as an even value when the alteration setting is even.

Example 30 includes the method as defined in example 28, further including altering the alterable attribute as an odd value when the alteration setting is odd.

The following claims are hereby incorporated into this Detailed Description by this reference. Although certain example systems, apparatus, articles of manufacture, and methods have been disclosed herein, the scope of coverage of this patent is not limited thereto. On the contrary, this patent covers all systems, apparatus, articles of manufacture, and methods fairly falling within the scope of the claims of this patent.

What is claimed is:

1. An apparatus comprising:
interface circuitry;
machine-readable instructions; and
at least one processor circuit to be programmed by the machine-readable instructions to:
    transform a watermark string to a numeric representation, the numeric representation including position values;
    determine a row hash value of a dataset based on a key value and at least one non-alterable attribute of the dataset;
    identify a first row of the dataset as an alterable row based on the row hash value; and
    determine an alteration setting for an alterable attribute of the first row based on one of the position values, the one of the position values based on a modulo of (a) an attribute hash value associated with the alterable attribute and (b) a length value of the numeric representation.

2. The apparatus as defined in claim 1, wherein one or more of the at least one processor circuit is to transform the watermark string to an ASCII representation.

3. The apparatus as defined in claim 1, wherein one or more of the at least one processor circuit is to determine the at least one non-alterable attribute based on one of an integer type or a floating-point type of a candidate attribute in the dataset.

4. The apparatus as defined in claim 3, wherein one or more of the at least one processor circuit is to compare the integer type of the candidate attribute to a sensitivity threshold.

5. The apparatus as defined in claim 4, wherein one or more of the at least one processor circuit is to:
    designate the candidate attribute as a non-alterable attribute when the sensitivity threshold is not satisfied; and
    designate the candidate attribute as an alterable attribute when the sensitivity threshold is satisfied.

6. The apparatus as defined in claim 4, wherein the sensitivity threshold is at least one of a mean value or a median value of a plurality of attributes of the dataset.

7. The apparatus as defined in claim 1, wherein one or more of the at least one processor circuit is to calculate the attribute hash value based on (a) header information associated with the alterable attribute and (b) the row hash value.

8. The apparatus as defined in claim 1, wherein one or more of the at least one processor circuit is to cause the alteration setting as one of an odd value of the alterable attribute or an even value of the alterable attribute based on a value of the one of the position values.

9. The apparatus as defined in claim 8, wherein one or more of the at least one processor circuit is to alter the alterable attribute as an even value when the alteration setting is even.

10. The apparatus as defined in claim 8, wherein one or more of the at least one processor circuit is to alter the alterable attribute as an odd value when the alteration setting is odd.

11. At least one non-transitory machine-readable medium comprising machine-readable instructions to cause at least one processor circuit to at least:
    transform a watermark string to a numeric representation, the numeric representation including position values;
    determine a row hash value of a dataset based on a key value and at least one non-alterable attribute of the dataset;
    identify a first row of the dataset as an alterable row based on the row hash value; and
    determine an alteration setting for an alterable attribute of the first row based on one of the position values, the one of the position values based on a modulo of (a) an attribute hash value associated with the alterable attribute and (b) a length value of the numeric representation.

12. The at least one non-transitory machine-readable medium of claim 11, wherein the machine-readable instructions are to cause one or more of the at least one processor circuit to transform the watermark string to an ASCII representation.

13. The at least one non-transitory machine-readable medium of claim 11, wherein the machine-readable instructions are to cause one or more of the at least one processor circuit to determine the at least one non-alterable attribute based on one of an integer type or a floating-point type of a candidate attribute in the dataset.

14. The at least one non-transitory machine-readable medium of claim 13, wherein the machine-readable instructions are to cause one or more of the at least one processor circuit to compare the integer type of the candidate attribute to a sensitivity threshold.

15. The at least one non-transitory machine-readable medium of claim 14, wherein the machine-readable instructions are to cause one or more of the at least one processor circuit to:

designate the candidate attribute as a non-alterable attribute when the sensitivity threshold is not satisfied; and designate the candidate attribute as an alterable attribute when the sensitivity threshold is satisfied.

16. The at least one non-transitory machine-readable medium of claim 14, wherein the machine-readable instructions are to cause one or more of the at least one processor circuit to determine the sensitivity threshold is at least one of a mean value or a median value of a plurality of attributes of the dataset.

17. The at least one non-transitory machine-readable medium of claim 11, wherein the machine-readable instructions are to cause one or more of the at least one processor circuit to calculate the attribute hash value based on (a) header information associated with the alterable attribute and (b) the row hash value.

18. The at least one non-transitory machine-readable medium of claim 11, wherein the machine-readable instructions are to cause one or more of the at least one processor circuit to cause the alteration setting as one of an odd value of the alterable attribute or an even value of the alterable attribute based on a value of the one of the position values.

19. The at least one non-transitory machine-readable medium of claim 18, wherein the machine-readable instructions are to cause one or more of the at least one processor circuit to alter the alterable attribute as an even value when the alteration setting is even.

20. The at least one non-transitory machine-readable medium of claim 18, wherein the machine-readable instructions are to cause one or more of the at least one processor circuit to alter the alterable attribute as an odd value when the alteration setting is odd.

\*   \*   \*   \*   \*